United States Patent
McMahon

(10) Patent No.: US 7,906,450 B2
(45) Date of Patent: *Mar. 15, 2011

(54) PHOTOCATALYTIC ELECTRODE AND FUEL CELL

(75) Inventor: John J. McMahon, Bronx, NY (US)

(73) Assignee: Fordham University, Bronx, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/719,122

(22) Filed: Mar. 8, 2010

(65) Prior Publication Data

US 2010/0190094 A1 Jul. 29, 2010

Related U.S. Application Data

(63) Continuation of application No. 11/823,760, filed on Jun. 28, 2007, now Pat. No. 7,687,424, and a continuation-in-part of application No. 11/393,630, filed on Mar. 30, 2006, now Pat. No. 7,696,121.

(60) Provisional application No. 60/921,107, filed on Mar. 30, 2007.

(51) Int. Cl.
| | |
|---|---|
| G01J 3/44 | (2006.01) |
| G01N 21/00 | (2006.01) |
| G01N 33/00 | (2006.01) |
| G01N 21/62 | (2006.01) |
| G01B 11/30 | (2006.01) |
| F21V 9/04 | (2006.01) |
| F21V 9/06 | (2006.01) |
| G02B 5/22 | (2006.01) |
| G02B 5/26 | (2006.01) |
| H01M 4/02 | (2006.01) |
| H01M 4/36 | (2006.01) |
| H01M 4/92 | (2006.01) |
| H01M 4/94 | (2006.01) |
| H01M 4/90 | (2006.01) |
| H01M 4/86 | (2006.01) |
| H01M 4/96 | (2006.01) |
| H01M 4/88 | (2006.01) |
| B01J 21/18 | (2006.01) |
| B01J 27/06 | (2006.01) |
| B01J 23/00 | (2006.01) |
| B01J 23/40 | (2006.01) |
| B01J 23/74 | (2006.01) |

(52) U.S. Cl. ........ 502/101; 502/181; 502/182; 502/185; 356/301; 356/337; 356/600; 436/103; 436/104; 436/171; 252/105; 252/161; 252/587; 429/523; 429/524; 429/525; 429/526; 429/530; 429/531

(58) Field of Classification Search .................. 502/101, 502/181, 182, 185; 356/301, 337, 600; 436/103, 436/104, 171; 252/105, 161, 587; 429/523–526, 429/530, 531

See application file for complete search history.

(56) References Cited

U.S. PATENT DOCUMENTS 4,674,878 A * 6/1987 Vo-Dinh ...................... 356/301

(Continued)

OTHER PUBLICATIONS

Chinese Office Action dated May 18, 2010 (6 pages) [Corresponding Chinese Patent Application No. 200780017570].
International Search Report for PCT/US2007/012752 mailed on Jul. 30, 2008 (1 page).

(Continued)

*Primary Examiner* — Patricia L Hailey

(74) *Attorney, Agent, or Firm* — Edwards Angell Palmer & Dodge LLP; Barry Kramer, Esq.; Brian R. Pollack, Esq.

(57) ABSTRACT

The invention provides an electrode comprising an electrically conductive material having a surface capable of producing surface enhanced Raman scattering of incident light from a complex adsorbed at the surface of the electrode, the complex including the electrically conductive material combined with a second material that is substantially reducible and not substantially oxidizable. The surface of the electrode can be microroughened. The invention also includes a method for making various embodiments of the electrode, and a method of generating electricity using the electrode. In accordance with a further aspect of the invention, a fuel cell is provided including the electrode of the invention.

15 Claims, 22 Drawing Sheets

Electroreduction of oxygen at gold (—), silver (□), and platinum (○) in aqueous 0.01 M HClO₄.

U.S. PATENT DOCUMENTS

| | | |
|---|---|---|
| 6,580,026 B1 | 6/2003 | Koyanagi et al. |
| 7,687,424 B2 * | 3/2010 | McMahon .................... 502/101 |
| 7,696,121 B2 * | 4/2010 | McMahon .................... 502/101 |
| 2005/0079630 A1 * | 4/2005 | Lazarenko-Manevich et al. ............................ 436/171 |
| 2005/0191428 A1 | 9/2005 | Buck |

OTHER PUBLICATIONS

Sun Yuhua, "Surface Enhanced Raman Spectroscopic Studies on Electrochemical Dissociation and Adsorption in Non-aqueous Systems" Master Thesis, Soochow University (30 pages) including English Abstract.

* cited by examiner

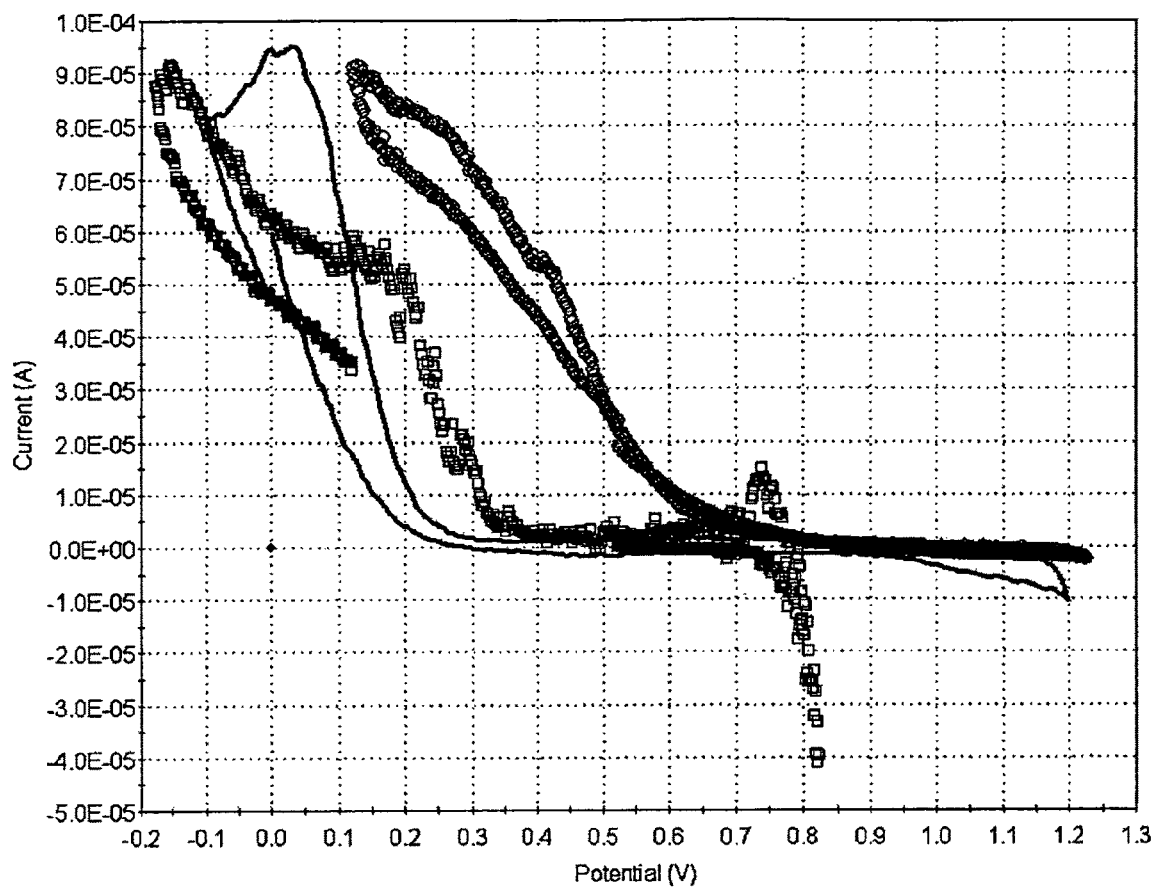
FIG. 1 Electroreduction of oxygen at gold (—), silver (□), and platinum (o) in aqueous 0.01 M $HClO_4$.

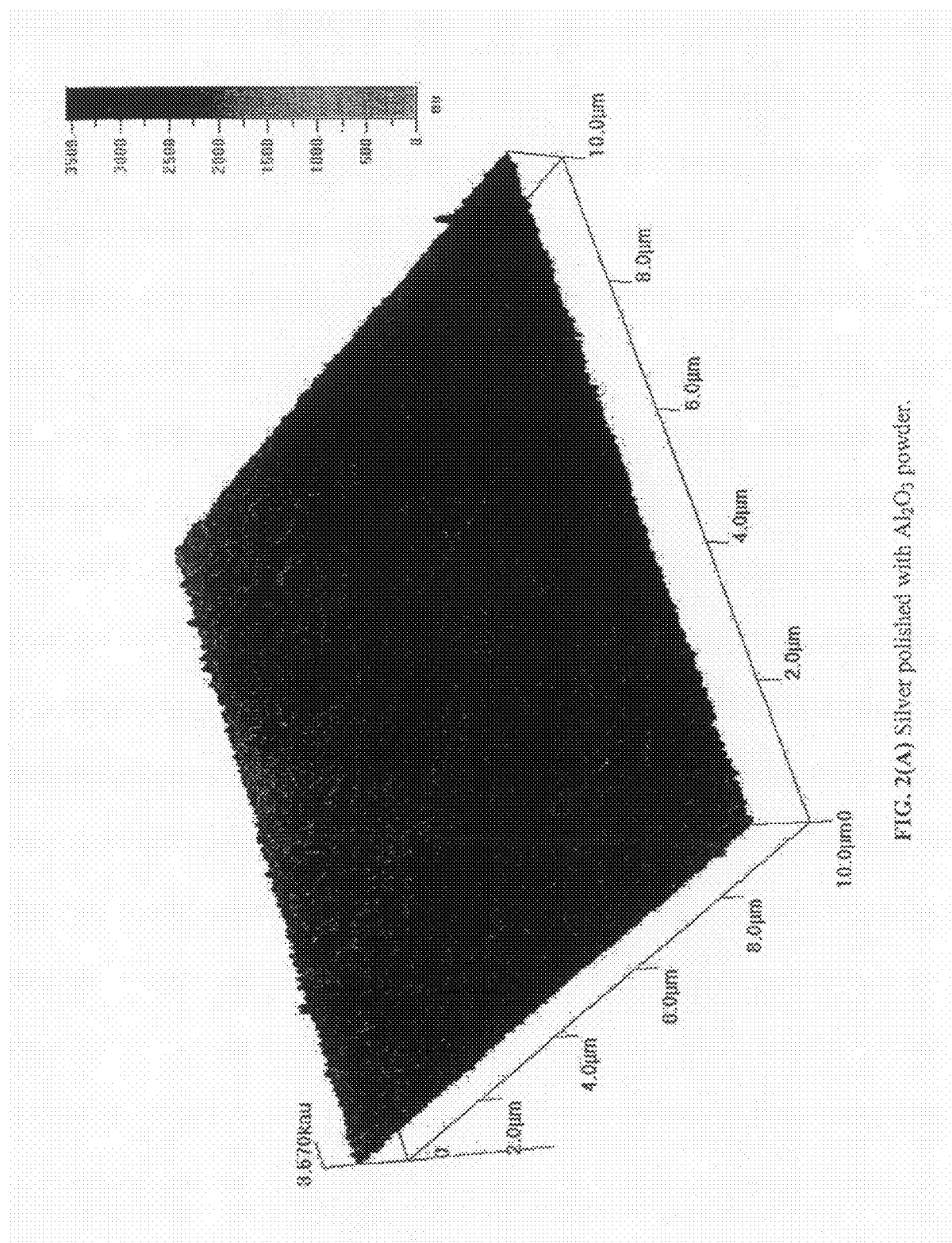
FIG. 2(A) Silver polished with Al₂O₃ powder.

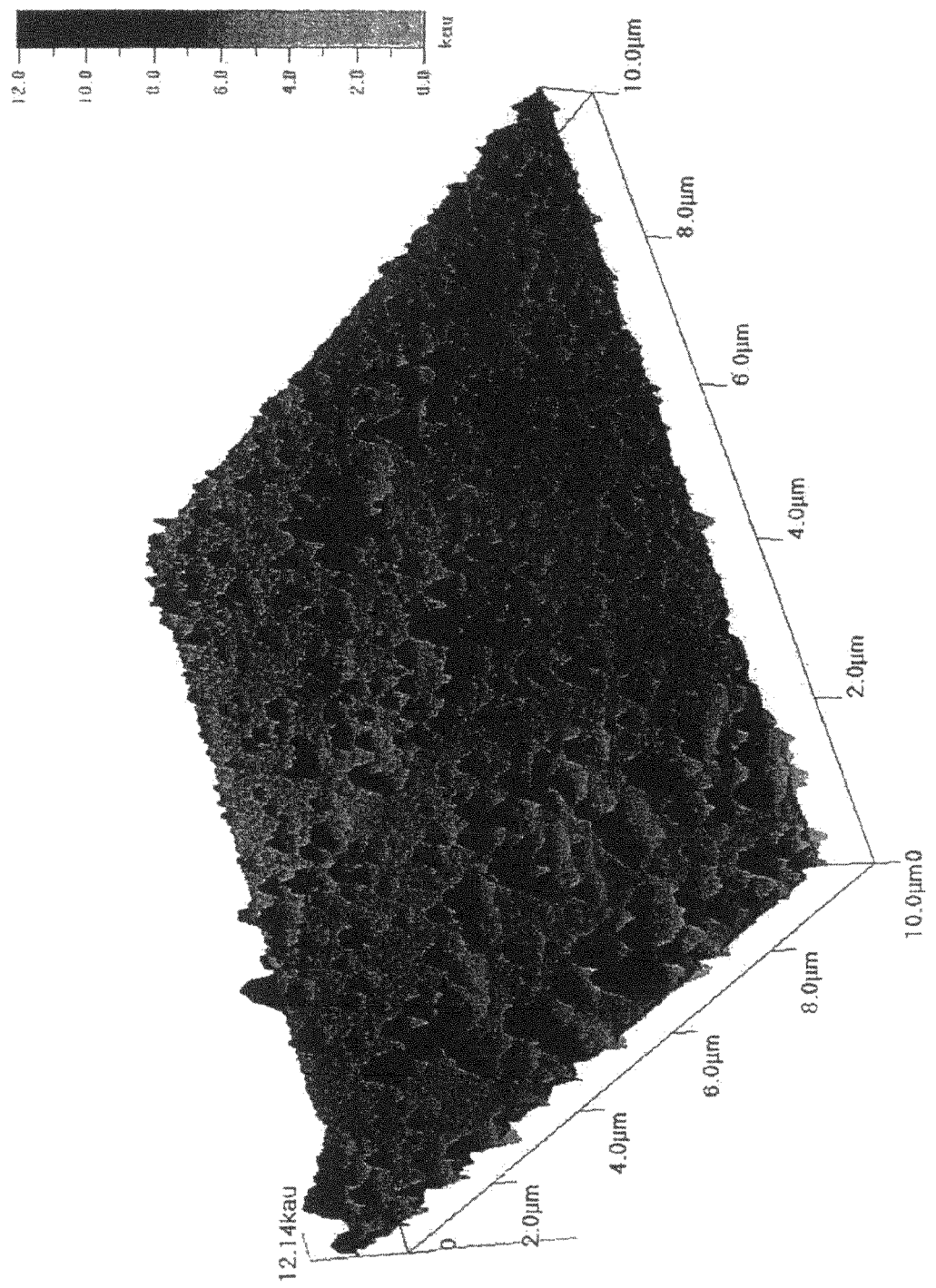
FIG. 2(B) Silver after electrochemical roughening.

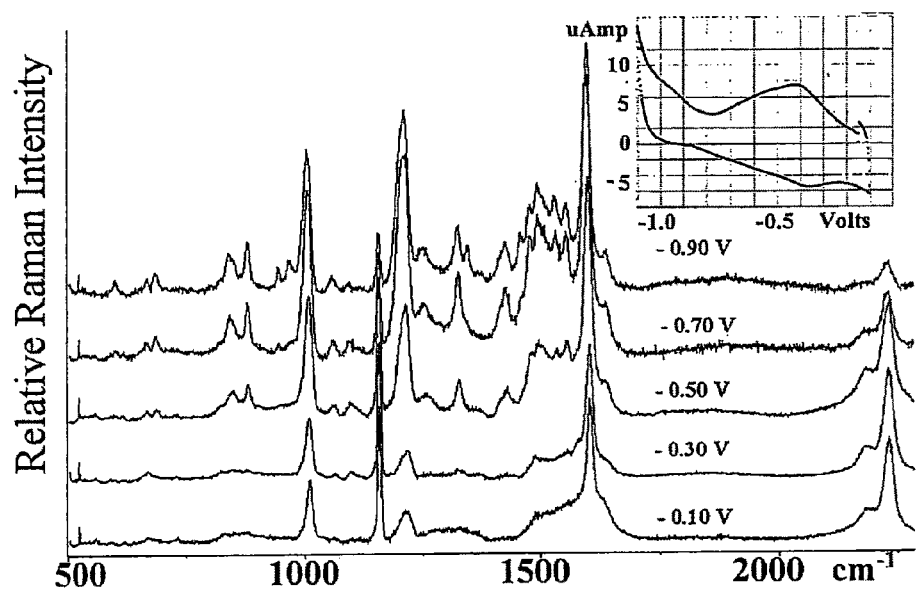
FIG. 3 Surface enhanced Raman spectrum of BPA adsorbed at a silver electrode as a function of applied potential. (Inset: cyclic voltammogram of BPA adsorbed on silver electrode in nitrogen)

Cyclic voltammetry

Photocurrent

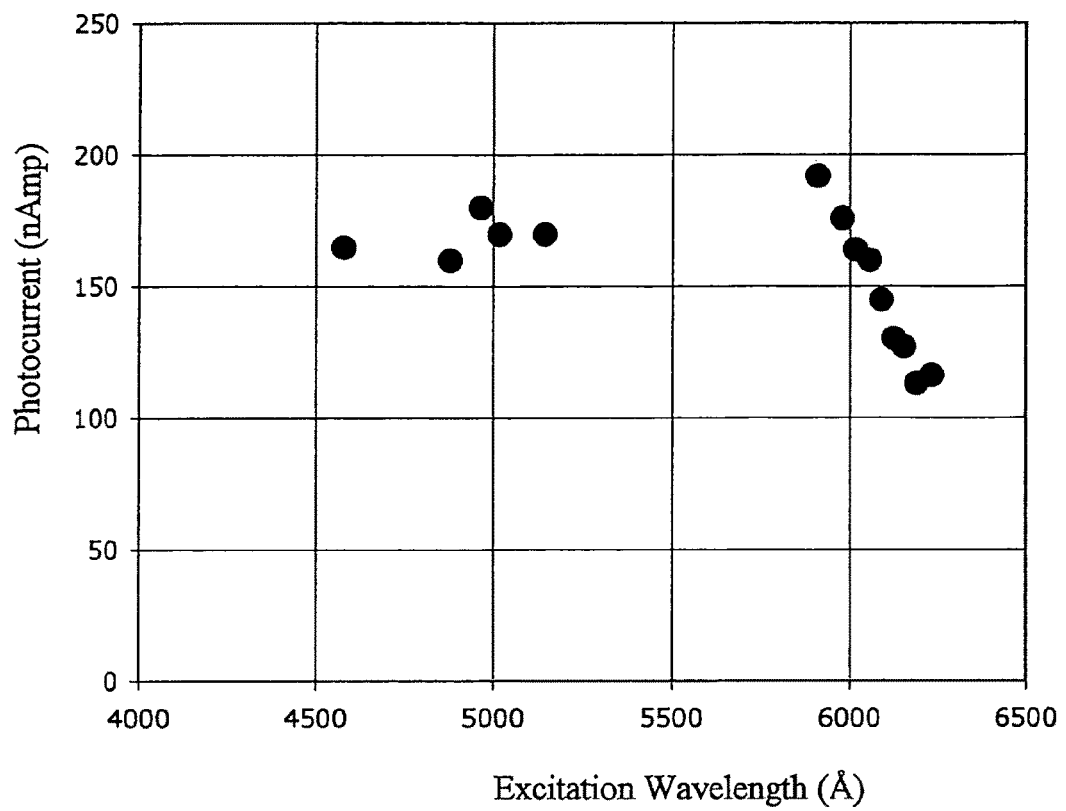
FIG. 5 Excitation profile of photocurrent observed upon irradiation of a BPA-covered, electrochemically pre-roughened silver electrode. Laser power: 100 mW, cell potential − 0.130 Volts vs. Ag/AgCl, electrode surface area: 0.15 $cm^2$.

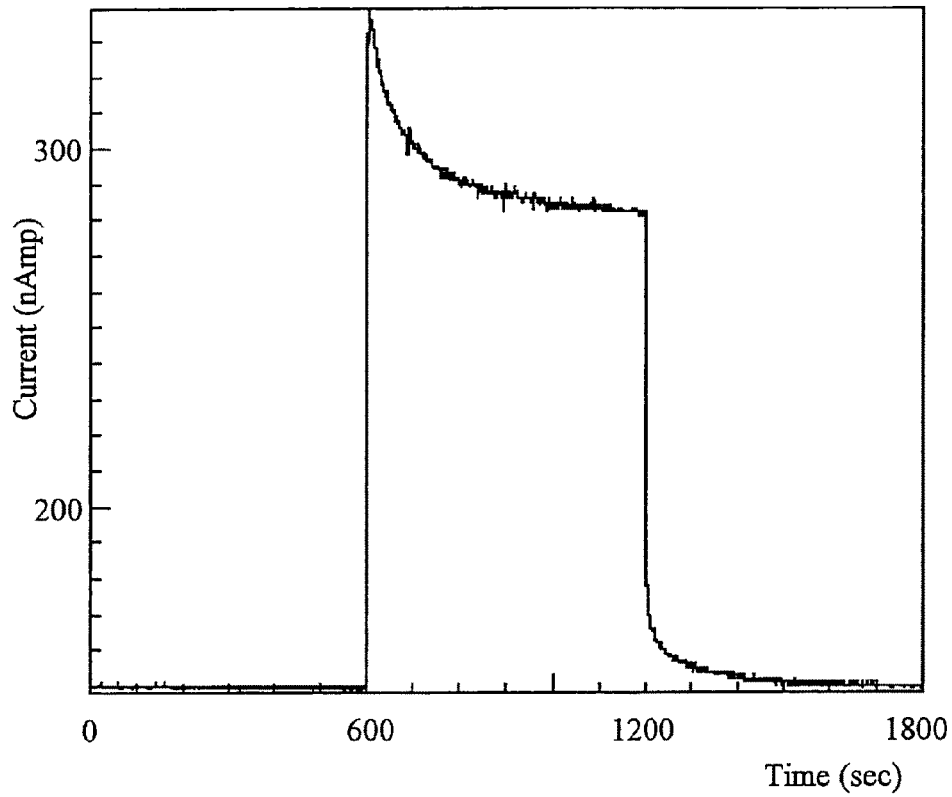

FIG. 6 Sustainability of the Photocurrent. The oxygen photocurrent is shown to continue for a ten-minute irradiation period suffering only losses due to concentration polarization of dissolved oxygen (5145 Å $Ar^+$, 100 mW, oxygen saturation maintained by bubbling $O_2$ through the 0.1 M NaCl electrolyte, V = -0.100 V (vs. Ag/AgCl reference electrode in 0.1 M NaCl), BPA-covered silver disk of area 0.15 $cm^2$).

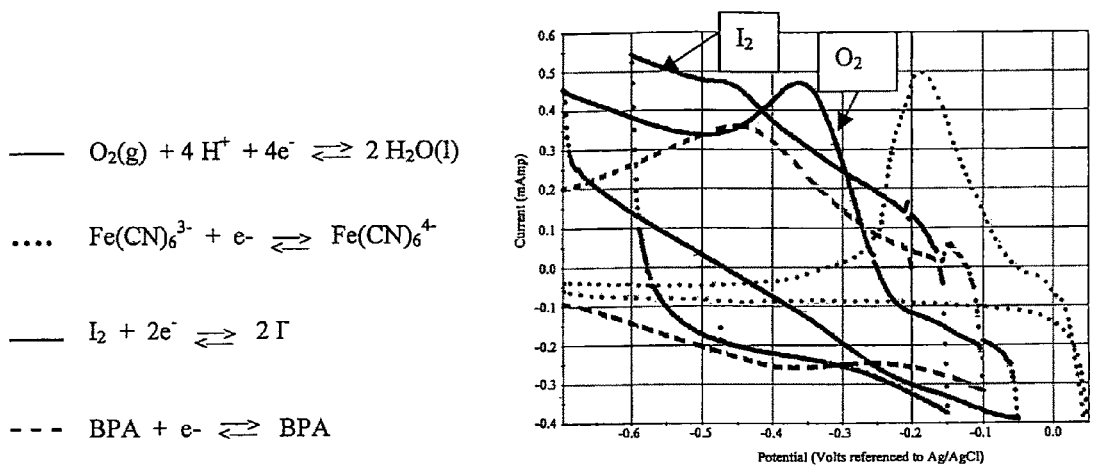
FIG. 7 Cyclic voltammetry of other reducible molecules: oxygen, potassium ferricyanide [$K_3Fe(CN)_6$, ····], iodine [$I_2$], bis-1,2-(4-pyridyl)acetylene [BPA, - - -]. (Ag/AgCl reference electrode).

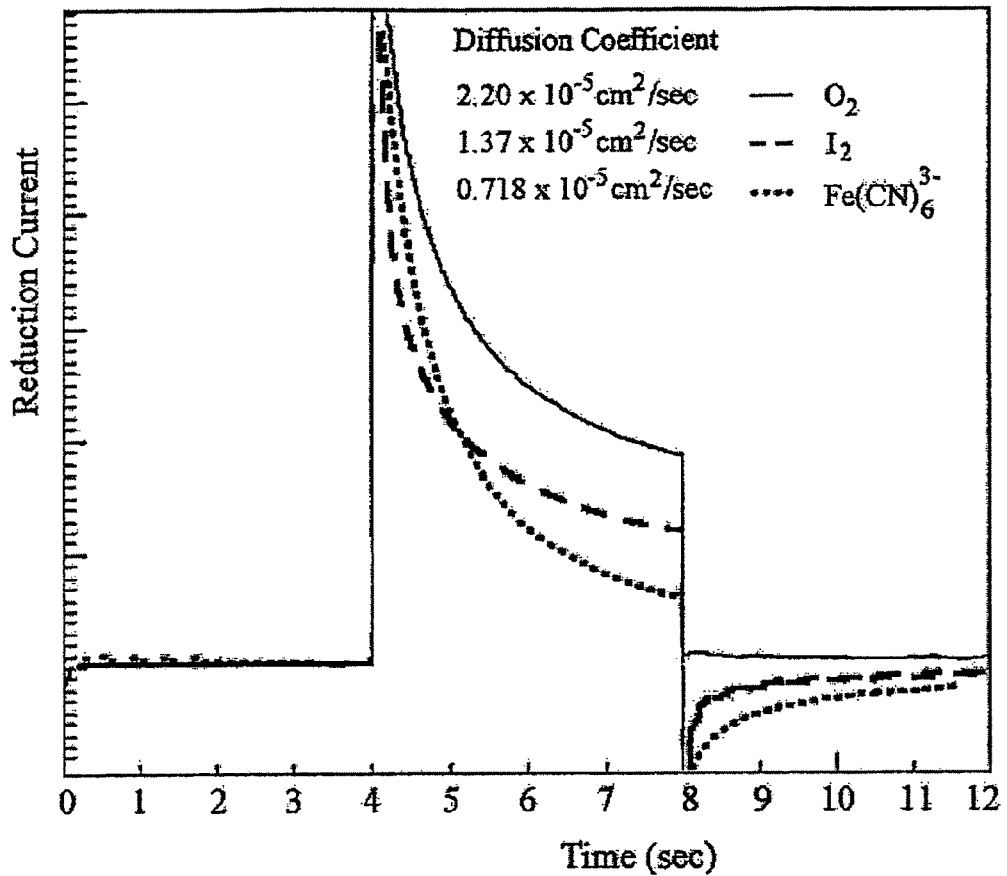
FIG. 8  Measurements of photocurrent associated with reduction of oxygen (0.1 M NaCl solution), iodine (5 x $10^{-4}$ M in 0.1 M NaCl), and ferricyanide (1 x $10^{-3}$ M in 0.1 M NaCl).

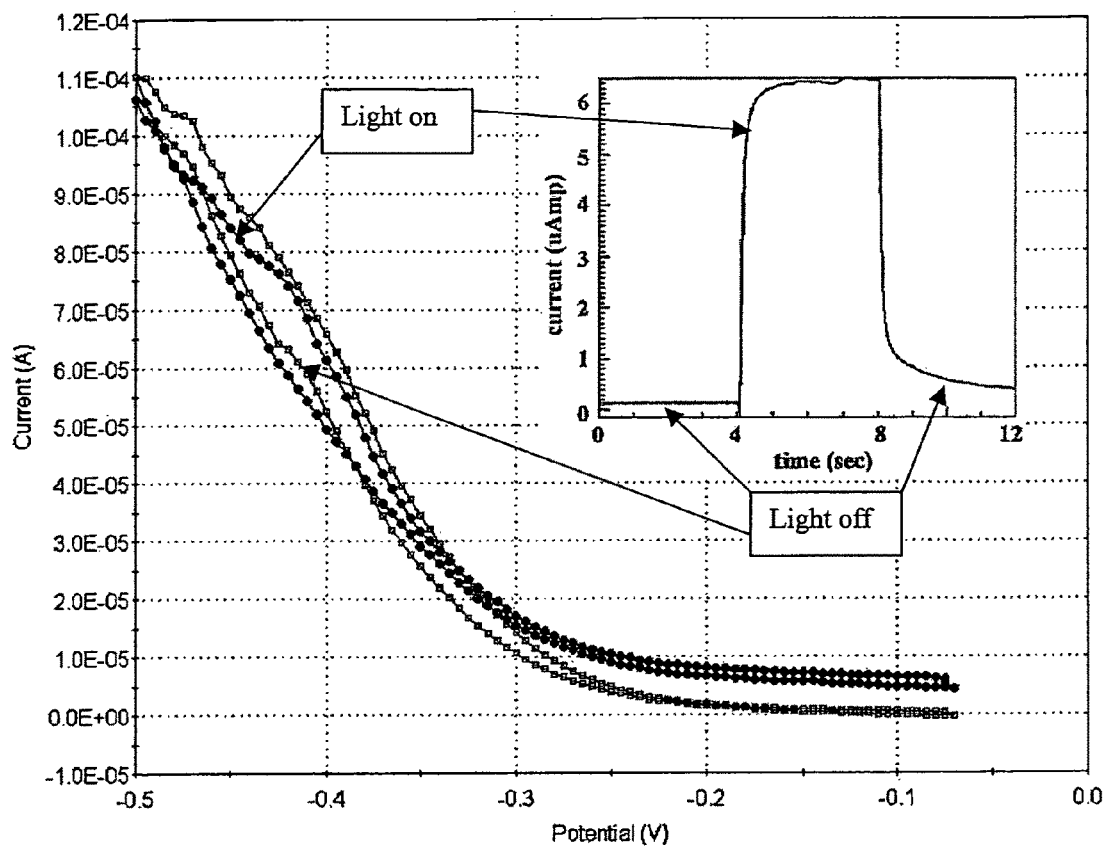
FIG. 9 Photocatalyzed oxygen reduction at an iodine-covered silver electrode (□: light off, ●:light on; Reference electrode: Ag/AgCl in 0.1 M NaCl).

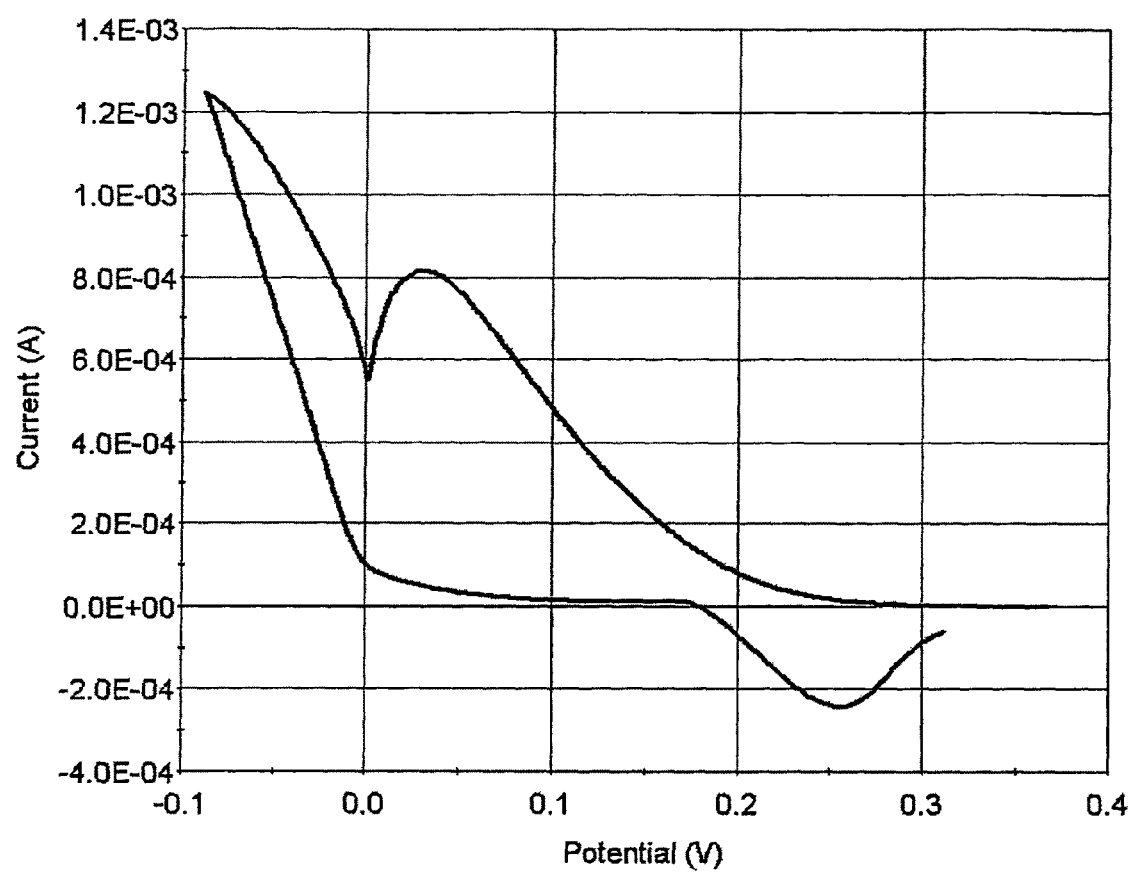
Fig. 18   Cyclic voltammetry at $I_2$-covered silver electrode for an oxygen-saturated solution of 0.1 M $NaClO_4$, pH 3.04. Potentials referenced to the RHE. Scan rate 20 mV/sec.

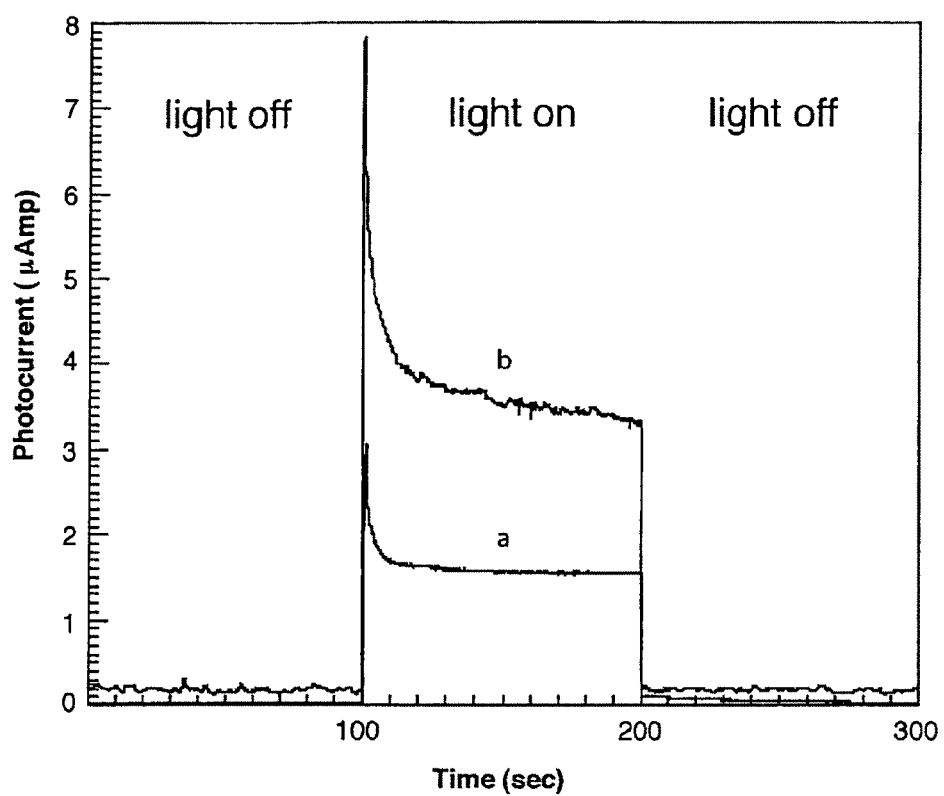
Fig. 19 Photocurrent observed for an AgI-covered silver electrode for (a) air saturated solution and (b) oxygen saturated solution with oxygen bubbling continuously.. Laser power: 100 mW, 5145 Å (Ar$^+$). Solution: 0.1 M NaClO$_4$, pH 3.04. Potential: + 0.35 V vs. RHE. Elongated illumination time of 100 sec.

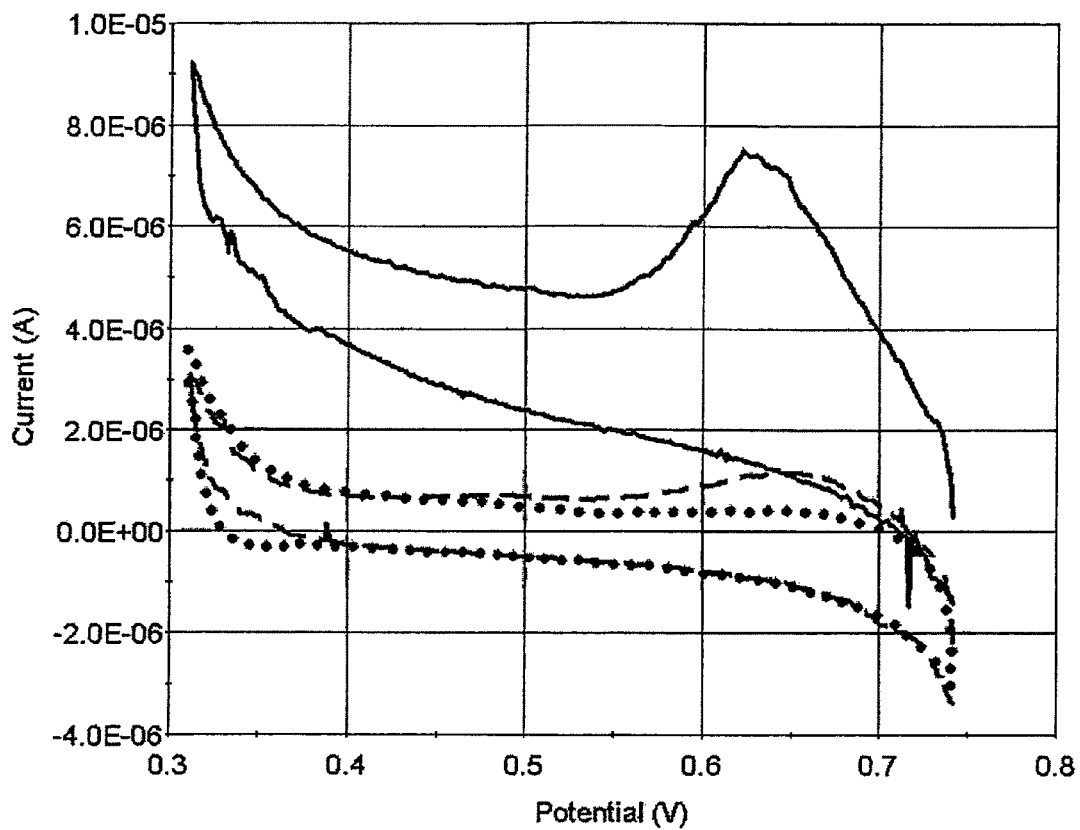
Fig. 20   Cyclic voltammetry at AgI-covered silver electrode during irradiation (—) and in the dark (– –) for an oxygen-saturated solution are compared with that for a nitrogen-saturated solution during irradiation (⋯). Laser power: 100 mW, 5145 Å (Ar$^+$). Solution: 0.1 M NaClO$_4$, pH 3.04. Potential: + 0.37 V vs. RHE. Oxygen or nitrogen gas bubbling continuously. Scan rate 20 mV/sec.

PHOTOCATALYTIC ELECTRODE AND FUEL CELL

CROSS-REFERENCE TO RELATED APPLICATION

This application claims priority to and is a continuation of U.S. patent application Ser. No. 11/823,760, filed Jun. 28, 2007, which in turn claims priority to U.S. Patent Application Ser. No. 60/921,107 filed Mar. 30, 2007, and is also a continuation-in-part of U.S. patent application Ser. No. 11/393,630 filed Mar. 30, 2006. Each of the aforementioned patent applications is incorporated by reference herein in its entirety.

BACKGROUND OF THE INVENTION

1. Field of the Invention

The present invention relates to methods and apparatus for producing electrical energy. Particularly, the present invention is directed to an electrochemical fuel cell that produces electricity by irradiating an electrode of the fuel cell with a light source.

2. Description of Related Art

A variety of fuel cell devices are known in the art for generating electric power. Of such devices, most include graphite anodes and cathodes comprising a finely dispersed platinum catalyst.

For example, a phosphoric acid fuel cell (PAFC) is a power generation cell which employs a porous electrolyte layer of silicon carbide matrix for retaining concentrated phosphoric acid. The electrolyte layer is interposed between carbon-based electrodes (an anode and a cathode) to form an electrolyte electrode assembly, sometimes referred to as a membrane electrode assembly ("MEA"). The membrane electrode assembly is then interposed between electrically conductive bipolar plates. The electrolyte electrode assembly and the bipolar plates form a single fuel cell for generating electricity by reacting a fuel such as hydrogen with oxygen across the electrolyte. A single fuel cell as described generally herein has an electrical power output of about 0.8 volts. To raise the voltage of the electrical output, a fuel cell stack can be formed by arranging any desired number of fuel cells in electrical series on top of one another. Since the bipolar plates are electrically conductive, current flows through the stack via the end plates.

Another type of fuel cell device is a solid polymer electrolyte fuel cell which employs a membrane electrode assembly including electrodes separated by a polymer ion exchange membrane (proton exchange membrane or PEM). Similarly, the membrane electrode assembly and the bipolar plates make up a unit of the power generation cell. Once again, a predetermined number of the power generation cells can be stacked together to form a fuel cell stack having a desired output voltage.

In the fuel cell stacks, a fuel gas such as a hydrogen-containing gas is supplied to the anode. The anode includes a catalyst that induces a chemical reaction of the fuel gas to split the hydrogen molecule into hydrogen ions (protons) and electrons. The hydrogen ions move toward the cathode through the electrolyte, and the electrons flow through an external circuit to the cathode, creating a DC electric current.

The fuel cell should be operated at or near an optimum temperature for the performance of power generation. Generally, fuel cells known in the art operate at temperatures significantly above ambient or room temperature (e.g., 75° F.). The optimum temperature for operation can vary with each type of fuel cell system. For example, a phosphoric acid fuel cell is operated in the temperature range of 120° C. to 200° C., and a solid polymer electrolyte fuel cell is operated in the temperature range of 60° C. to 90° C. In order to maintain the temperature of the power generation cells in the desirable temperature range, various cooling systems have been adopted. Typically, the power generation cells are cooled by supplying coolant such as water to a coolant passage formed in the bipolar plates of the fuel cell stack.

Generally, fuel cells provide an environmentally clean alternative to energy production from fossil fuel combustion. The electrochemical efficiency of a fuel cell (currently ≈65%) handily exceeds that of internal combustion engines (<30%). However, in spite of recent increases in the prices of crude oil and natural gas, fossil fuel combustion continues to hold a significant economic advantage over fuel cells. The high cost of fuel cell energy production is attributable to the need for addition of expensive catalysts (platinum) to accelerate the oxidation of the fuel (hydrogen) at the anode and the reduction of oxygen at the cathode. The slow oxygen reduction reaction alone accounts for the largest limitation to the fuel cell efficiency, even in the presence of platinum catalyst.

The demand by dioxygen molecules ($O_2$) for electrons during reduction at electropositive metal electrodes forces the electrostatic potential of the metal to wander negatively (referred to as a large negative overvoltage) before giving up the electrons needed by oxygen. Because the output power of a fuel cell is defined by the product of the cell potential (V) and current (I), i.e., P=VI, a drop in the potential lowers the power output and the cell efficiency linearly. Typically, a platinum-catalyzed hydrogen fuel cell operates at moderate current levels at cell voltages close to +0.75 volts instead of the thermodynamic equilibrium cell voltage of +1.23 volts. This amounts to an overvoltage of −0.48 volts below the thermodynamic voltage, thus limiting the efficiency to near 60%. Experiments probing alternatives to platinum catalysis of the electroreduction of oxygen continue to define a vigorous area of research. Nonetheless, platinum remains the best known electrocatalyst of the oxygen reduction reaction. In recent years, advances in fuel cell utility have relied upon improved methods for dispersing the platinum catalyst only at the active sites of graphite electrodes. The total amount of platinum needed to sustain operational currents was thereby reduced, along with the overall cost of fuel cells. However, the fundamental limitation caused by the overvoltage problem still persists.

Thus, there remains a compelling need in the art for a fuel cell that is more electrochemically efficient and/or more cost effective than known fuel cells. There is also a continuing need for a fuel cell system that can be operated at lower temperatures, such as at room temperature. The present invention provides a solution for these problems.

SUMMARY OF THE INVENTION

The purpose and advantages of the present invention will be set forth in and become apparent from the description that follows, as well as will be learned by practice of the invention. Additional advantages of the invention will be realized and attained by the methods and systems particularly pointed out in the written description and claims hereof, as well as from the appended drawings.

To achieve these and other advantages and in accordance with the purpose of the invention, as embodied herein and broadly described, in one aspect, the invention includes an electrode comprising an electrically conductive material having a metal complex adsorbed at its surface (such as a metal-halide complex) such that the electrode is capable of producing surface enhanced Raman scattering of incident light.

In accordance with another aspect, the invention includes an electrode comprising an electrically conductive material having a roughened surface capable of producing surface enhanced Raman scattering of incident light from an adsorbate material adsorbed on the surface of the electrode.

In both cases, the adsorbate is substantially reducible but not appreciably oxidizable. An appropriately reducible adsorbate would reduce, for example, by addition of multiple electrons, with the first electron creating an intermediate radical anion. These electrodes find utility in a variety of applications, such as in a fuel cell as the cathode which, when irradiated with light, catalyzes the electroreduction of oxygen overcoming the overvoltage problem and improving the efficiency of the fuel cell. The invention also includes, for example, a method for making the electrode in various manners, and a method of generating electricity using the electrode. In accordance with a further aspect of the invention, a fuel cell is provided including the electrode of the invention.

It is to be understood that both the foregoing general description and the following detailed description are exemplary and are intended to provide further explanation of the invention claimed.

The accompanying drawings, which are incorporated in and constitute part of this specification, are included to illustrate and provide a further understanding of the method and system of the invention. Together with the description, the drawings serve to explain the principles of the invention.

BRIEF DESCRIPTION OF THE DRAWINGS

FIG. 1 depicts the relative performance of gold, silver, and platinum in the electroreduction of oxygen in the absence of catalysis as provided by the present invention.

FIGS. 2(a)-2(b) depict a silver surface prior to and after electrochemical roughening, respectively.

FIG. 3 depicts surface enhanced Raman scattering produced by a representative embodiment of an electrode made in accordance with the present invention when the electrode is irradiated.

FIG. 5 depicts the performance, as a function of excitation wavelength, of an electrode made in accordance with the present invention.

FIG. 6 depicts the sustainability of photocurrent produced in accordance with the present invention.

FIG. 7 depicts the electroreduction of several materials that can be photocatalyzed in accordance with the teachings of the present invention.

FIG. 8 further depicts the performance of an electrode made in accordance with the present invention relative to the materials illustrated in FIG. 7.

FIG. 9 depicts the performance of another embodiment of an electrode made in accordance with the present invention.

FIG. 18 depicts the electroreduction of an oxygen-saturated solution of $NaClO_4$ using an $I_2$-covered silver electrode.

FIG. 19 is a plot of observed oxygen reduction photocurrent as a function of time of a solution for an Ag—I coated silver electrode.

FIG. 20 is depicts the cyclic voltammetry of an Ag—I$^-$ covered silver electrode during irradiation and in the dark for an oxygen saturated solution as compared with a nitrogen-saturated solution.

DETAILED DESCRIPTION OF THE INVENTION

Figure 4A:
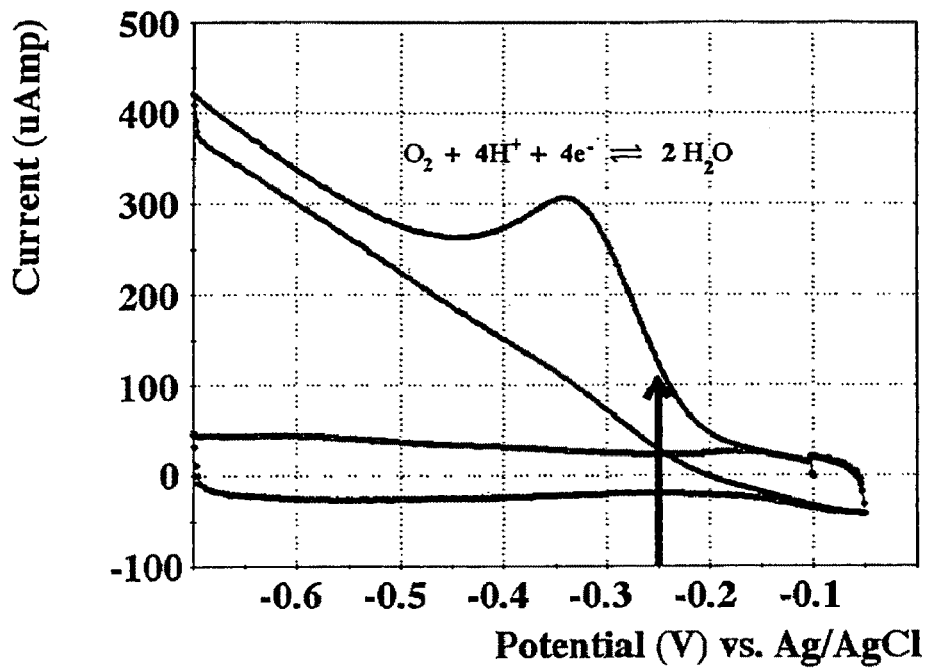
FIG. 4 depicts the photocurrent and its dependence on the applied voltage of an electrode made in accordance with the present invention.

Reference will now be made in detail to the present preferred embodiments of the invention, examples of which are illustrated in the accompanying drawings. The method and corresponding steps of the invention will be described in conjunction with the detailed description of the system.

As mentioned above, in conventional fuel cells, the demand by dioxygen molecules ($O_2$) for electrons during reduction at electropositive metal electrodes forces the electrostatic potential of the metal to wander negatively (referred to herein as a large negative overvoltage) before giving up the electrons to oxygen.

FIG. 1 compares the reduction of oxygen at silver and platinum electrodes without benefit of the invention described herein. These results are provided to demonstrate the relative catalytic behavior of platinum compared to silver prior to the application of the photocatalysis described herein. For FIG. 1, the electrode area is 0.196 $cm^2$.

Without the benefit of the invention described herein, silver is not as attractive as platinum for use in a fuel cell cathode. Specifically, as illustrated in FIG. 1, when compared to the thermodynamic voltage for oxygen reduction of 1.23 volts vs. a Normal Hydrogen Electrode ("NHE", described below), oxygen reduction at platinum commences near +0.75 volts, at silver near +0.35 volts. and at gold near +0.25 volts. Equivalent current densities for oxygen reduction at gold, silver, and platinum are observed when platinum is polarized near +0.25 volts more anodic than silver, and 0.35 volts more anodic than gold, highlighting the catalytic performance of platinum, though nonetheless still requiring at least a half-volt overvoltage below the thermodynamic voltage. Furthermore, as shown in FIG. 1, silver begins to oxidize in the perchloric acid medium near +0.80 volts while platinum and gold begin to oxidize above +1.1 volts. Thus, even with complete removal of the overvoltage for oxygen reduction at silver, silver is limited by its own oxidation to commence reduction of oxygen at voltages no more positive than +0.80 volts, i.e., effectively matching the utility of platinum.

By using electrodes as disclosed herein, fuel cells can be constructed that largely reduce the requirement for the overvoltage in the reduction of oxygen. This permits operating a device such as a fuel cell near or at the thermodynamic equilibrium cell voltage of +1.23 volts, limited only by the oxidation potential of the particular metal used for the cathode. When using the invention provided herein, as will be shown and described, the use of silver and other particular metals as cathodes becomes very attractive.

Moreover, the cost of silver is less than $1/100^{th}$ that of platinum so silver's utility in fuel cell energy production is commercially attractive as well. Furthermore, other metals, particularly gold, whose oxidation potential ($E°=+1.498$ Volts) is above the thermodynamic voltage for oxygen reduction, show promise for defeating the limitations caused by the electrode oxidation potential though sacrificing the extreme economic advantages of silver.

In accordance with the invention, an electrode is provided made from a conductive material with a surface adapted and configured to produce surface enhanced Raman scattering of incident light by addition of an adsorbate layer.

For purposes of illustration and not limitation, as embodied herein, the electrode can be made by anodizing a conductive electrode in a solution to create a complex on the surface of the electrode that combines the metal of the electrode with a material from the solution. For example, a silver electrode may be anodized in a solution including a halide material, such iodide ion ($I^-$), to form a silver-iodide complex layer at the electrode surface. It will be appreciated that the layer may cover a portion of the electrode or the entire electrode, as desired.

In accordance with this embodiment, the surface of the electrode need not be roughened, and may even be polished prior to anodization. This embodiment of an electrode is particularly advantageous as it does not require pre-roughening of the surface of the electrode, although such roughening could be practiced, if desired. It is believed that the creation of a silver halide complex at the silver surface by anodization in a halide medium and subsequent irradiation of this silver halide-covered surface results in a generation of sites of metallic silver deposits, or roughness features, at the electrode/silver halide interface. Silver iodide-covered silver has been shown to be capable of reducing a variety of solution-bound molecules [c.f., Morgan S. Sibbald, George Chumanov, Therese M. Cotton "Reduction of Cytochrome c by Halide-Modified, Laser-Ablated Silver Colloids", J. Phys. Chem. (1996), 100, 4672-4678, incorporated by reference herein in its entirety.]

In further accordance with this embodiment of the invention, the surface of the electrode is capable of producing surface enhanced Raman scattering of incident light, and, as such, implies the presence of roughness features. These roughness features are defined by a complex including the electrically conductive material (such as silver, or other suitable metal) combined with a second material. The complex is substantially reducible and not substantially oxidizable. Because the complex is formed by anodization of the electrically conductive material in a solution containing the second material, e.g., iodide ion, without subsequent reduction of the complex, the degree of roughness is limited. Some roughening accompanies etching of the surface during anodization, and additional roughening accompanies photoreduction, during subsequent irradiation of the surface. These mechanisms yield deposits of the metal on the surface of the electrode. The resultant roughness is best characterized as small or atomic scale features at the electrode surface. This can be contrasted with the structure of an electrode made in accordance with another aspect of the invention as depicted in FIG. 2B, where islands of metallic material (e.g., silver) defined the surface of the electrode, as described further herein.

Preferably, the metal in the complex includes one (or more) metals selected from the group consisting of (in order of increasing oxidation potential) silver, osmium, palladium, iridium, platinum, and gold. As will further be appreciated, in addition to halides (such as Iodide), other suitable materials, including, for example, sulfide ($S^{2-}$), can be used in the complex to complement the metal yielding a complex that is substantially reducible but not appreciably oxidizable.

By way of further example, an electrically conductive electrode may be provided having a roughened surface with an adsorbate material adsorbed at the surface. The surface is roughened such that the surface is capable of producing surface enhanced Raman scattering from molecules adsorbed on the electrode surface. Suitable adsorbates are described in detail below. When incident photons interact with the adsorbate-covered metal surface, they inelastically scatter such that energy is either gained or lost by the photons. The scattered photons are shifted in frequency accordingly. This inelastic scattering is called Raman scattering. The intensity of the Raman scattered light from adsorbates at appropriately roughened metal surfaces is enhanced over that expected for the low surface concentration of adsorbate, hence the label "Surface Enhanced Raman Scattering" or SERS. While there is some debate in the scientific community as to the precise structural features of a surface that are needed to generate SERS, experiments have shown that electrochemical roughening, for example, can produce this effect. As described herein, it is believed that other types of surface treatments can also produce surface enhanced Raman scattering from adsorbate molecules. Thus, a surface capable of producing surface enhanced Raman scattering from adsorbate molecules is intended to refer to all suitable surfaces known to those of skill in the art capable of producing Raman scattering. The material of the adsorbate and the material of the electrode cooperate to form a reducible complex at the surface of the electrode.

It is believed that the electrode made in accordance with this embodiment of the invention has a roughened surface including a plurality of adatoms or clusters of adatoms of a metallic material deposited on electrically conductive material. An adatom is generally characterized as an atomic scale defect, such as on the surface of the electrode. A reducible adsorbate material is applied to the surface of the roughened electrode by any number of known methods, including but not limited to dipping the electrode into an appropriate solution containing the adsorbate material.

Regardless of the method described above used to prepare the electrode, when irradiated with light, the adsorbate-treated electrode can continuously deliver reducing equivalents (i.e., electrons) to oxygen, or any other available reducible material at voltages that are significantly positive of those where reduction occurs at the untreated electrode in the dark. Thus, electroreduction is photocatalyzed at the adsorbate-covered electrode during irradiation. Such an electrode can be used in a variety of applications, such as in an electrochemical fuel cell.

A roughened electrode can be provided wherein the conductive material and the material of the adatoms or adclusters can be made from the same or different type of conductive material. Preferably, the clusters are formed from a metallic material selected from the group consisting of (in order of increasing oxidation potential) silver, osmium, palladium, iridium, platinum, and gold). In addition, use of suitable alloys and/or mixtures containing one or more of these metals as a cathode is also within the scope of the invention.

In accordance with one embodiment of the invention, one way to form a surface having adatoms or clusters of adatoms as described herein that is suitable for irradiation to initiate photocatalysis is to immerse the material to be treated in a liquid chloride medium. In accordance with a preferred embodiment of the invention, silver is used as the electrode material. The silver electrode can then be modified with an oxidation-reduction cycle as described in D. L. Jeanmaire, R. P. van Duyne, *J. Electroanal. Chem.* 84, 1-20 (1977), which is incorporated by reference herein to create the active clustered silver sites. After immersion in the chloride medium, a positive voltage is applied across the silver through the chloride medium, which causes silver to oxidize and form solid AgCl. The current is then reversed, causing the silver in solution to deposit back on the surface of the electrode.

Atomic force micrographs ("AMF") of an exemplary silver electrode surface, that has been subjected to this oxidation-reduction cycle, are provided in FIGS. 2(A) and 2(B) and reveal the roughness generated by the cycle. Specifically, FIGS. 2(A) and 2(B) depict a 10 micron×10 micron section of a silver electrode surface before and after such electrochemical roughening, respectively. In FIG. 2(A), the electrode was polished with progressively finer aluminum oxide powders down to 0.05 microns, rinsed with distilled water and air-dried prior to the AFM scan. In FIG. 2(B), an electrode surface area of approximately 1 cm$^2$ was oxidized by polarizing the electrode to near +0.100 Volts (vs. an Ag/AgCl reference electrode) in an aqueous 0.10 M NaCl solution such that a current of 5 milliamp was allowed to pass for ten seconds. Then the electrode was polarized to −0.500 Volts (vs. an Ag/AgCl reference electrode) to reverse the oxidation. The accompanying oxidation/reduction reaction is:

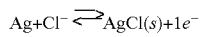

The electrode was then rinsed with distilled water and air dried before recording the AFM shown.

It will be appreciated that this operation can be performed with an electrode made from silver or other conductive material that is plated with silver, such as a silver plated copper electrode. Materials having a surface suitable for use as an electrode as described herein are commercially available. For example, a porous silver membrane material sold under the name "Silver Metal Filter Membranes" available from Sterlitech™ Corporation (22027 70th Ave. S., Kent, Wash. 98032-1911 USA, Tel: 877-544-4420; www.sterlitech.com) can be used. In the context of a fuel cell, the porous silver membrane provides the required liquid/gas interface between the reactant gas and the moist polymeric electrolyte membrane (PEM) while, at the same time, providing a large surface area that can be made active by the procedure of roughening and coating with adsorbate as described above. The porous silver membranes provide the additional advantageous property of supporting transmission of the required light deep into the cathode via pores, of diameter greater than the wavelength of light used, that act as light pipes. Such a filter material can be coated with other materials such as gold, etc., such as by electroplating, vapor deposition, underpotential deposition, sputter coating, and the like to take advantage of the properties of those materials. Manufacturing other metals into similar porous membranes appropriate to applications in fuel cells is also within the scope of the invention.

It will be further appreciated by those of skill in the art that all embodiments of electrodes, fuel cells and the like described herein made in accordance with a roughened electrode can also be prepared without pre-roughening, for example, by way of the anodizing process also embodied herein.

Generally, methods for creating or treating metal surfaces, such as the electrochemical roughening discussed above, nanofabrication, chemical vapor deposition, sputtering and plasma enhanced chemical vapor deposition, for use in surface enhanced Raman scattering ("SERS") experiments yield the characteristic roughness suitable for use as an electrode material in accordance with this aspect of the invention.

The role of roughness in enhancing surface Raman intensities continues to incite debate among researchers. A prominent theory connecting the prerequisite roughness to the mechanism of enhancement of surface Raman intensity is referred to as the chemical enhancement mechanism. This mechanism is based on a photon-assisted electron transfer between the metal and molecules adsorbed onto atomic scale roughness features (e.g., adatoms), of the metal surface. Resonant coupling between the wavelength of incident radiation and the energy difference between the metal and adsorbate electronic states promotes enhancement of the Raman scattered light intensity. It is well understood that the electronic states of the metal and the adsorbate, that are coupled in this photon-driven charge transfer, can be delocalized by mixing with electronic states of nearby metal atoms in the conduction band system of the metal, rendering the resonant enhancement negligible. However, at atomic scale roughness features such as adatom surface sites, the absence of neighboring metal atoms promotes the localization of the charge transfer excitation and facilitates resonance Raman intensification.

By analogy to this chemical surface Raman enhancement mechanism, photon-driven excitation of an electron from a metal adatom surface site to an adsorbate at that site can be expected to yield a radical anion adsorbate that is long-lived because of the absence of a decay mechanism through the conduction band system of the metal substrate. This extension of the lifetime of radical anion adsorbate at adatom roughness sites assures the availability of electrons for oxygen reducing at those surface sites as described herein. Using these technologies, materials such as silver, osmium, palladium, iridium, platinum, and gold (or alloys containing one or more these metals) can be deposited on a base conductor to form adatoms or clusters of adatoms of those materials that are suitable for use as an electrode made in accordance with the invention.

Another prominent theory connecting surface roughness to the SERS enhancement mechanism involves electromagnetic coupling of incident light to the surface plasmon. When the surface is roughened the electromagnetic field at the roughness feature is enhanced by resonance between the frequency of the incident light and that of the surface plasmon. Adsorbate molecules present at the junction between two surface roughness features experience particularly large electromagnetic field enhancement and the Raman signal intensifies as the field squared.

Such electromagnetic coupling of incident light to the surface plasmon at a roughness feature yields emission of hot electrons from the metal into the electrolyte where they can be scavenged by present reductants, e.g., adsorbate, protons, oxygen, etc. Thus, charge transfer of electrons from the metal accompanies both chemical and electromagnetic mechanisms of SERS enhancement, and may serve as a source of reducing equivalents to reductants diffusing to the electrode surface.

Electrochemical roughening of gold in a chloride medium, for example, using a procedure similar to that discussed for silver above, has been demonstrated to yield the micro-roughened surface required for observation of SERS using gold, making gold suitable for use as an electrode as described herein. Ordinarily, oxidation of gold in chloride creates soluble gold chloride ($AuCl_4^-$) unlike silver which forms an insoluble silver chloride (AgCl) precipitate at the surface. Dissolution of gold chloride during oxidation limits the roughness attainable during subsequent reduction of gold chloride and deposition of gold because the process is diffusion limited allowing time for migration of adatoms filling surface defects. To limit dissolution of the gold material and to form the microroughness required, multiple rapid oxidation-reduction cycles are performed. A detailed description of this process is known in the art and is described, for example, in Gao, Ping; Gosztola, David; Leung, Lam Wing H.; Weaver, Michael J. "Surface-enhanced Raman scattering at gold electrodes. Dependence on electrochemical pretreatment conditions and comparisons with silver". *Journal of Electroanalytical Chemistry and Interfacial Electrochemistry* (1987), 233(1-2), 211-22, which is incorporated by reference herein in its entirety.

In further accordance with the invention, an adsorbate is provided for applying to the surface of the electrode.

For purposes of illustration and not limitation, a variety of materials can be used as an adsorbate in accordance with the invention. Generally, the adsorbate may be a material that is reducible whereby that reduction involves more than one electron, with the first electron delivered to the adsorbate creating a radical anion intermediate.

Unsaturated organic adsorbates that typically reduce higher order carbon-carbon bonds via acceptance of two electrons and two protons serve as suitable adsorbates for the photocatalysis of oxygen reduction. As described in J. J. McMahon, T. J. Gergel, D. M. Otterson, C. A. McMahon, R. M. Kabbani, *Surface Science* 440(3), 357-374 (1999)], Applicant previously discovered that upon irradiation of trans-4-stilbazole,

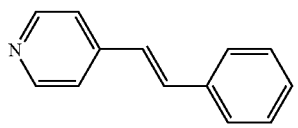

trans-4-stilbazole adsorbed at a silver electrode, surface atomic oxygen was photochemically incorporated into the molecule. The source of atomic oxygen was the reduction of dissolved $O_2$. However, after a short period of operation, the electrode ceased to photocatalytically reduce oxygen due to photochemical formation of 4'-hydroxy-trans-4-stilbazole

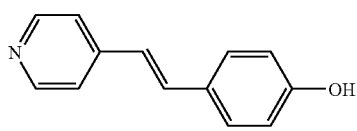

4'-hydroxy-trans-4-stilbazole on the surface of the electrode. Thus, this work did not result in a system capable of providing continuous electrical current from reduction of oxygen.

Nonetheless, an investigation was undertaken to determine if any absorbates existed that could facilitate continuous delivery of reducing equivalents (i.e., electrons) to a reducible material like oxygen from an irradiated electrode. The results have been surprising. As described herein, adsorbates have been discovered that continuously deliver electrons to oxygen or other reducible material from an adsorbate-covered electrode that is irradiated.

In accordance with an embodiment of the invention, an organic molecule can be used for the adsorbate. The characteristics of an organic adsorbate that can support photocatalytic reduction of oxygen (or other reducible material) are those that are reducible with more than one electron per molecule without being photochemically altered during the process of irradiating the cathode. Additionally, the active adsorbate would be required to remain attached to the electrode surface at the operating temperature of the cell either though physisorption or chemisorption.

For purposes of illustration and not limitation, bis-pyridyl acetylene ("BPA") can be used as the adsorbate.

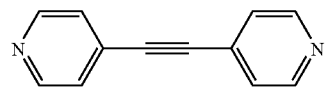

Bis-1,2-(4-pyridyl)-acetylene or BPA

The use of BPA as an adsorbate is described below in detail in Example I.

One method by which an organic adsorbate may be applied to the surface of the electrode is by dipping the electrode in a solution containing the adsorbate. The adsorbate is then adsorbed at the surface of the electrode, with adsorbate at the adatom or adcluster roughness features at the surface defining the surface active sites.

Observed photoreduction current densities vary with the adsorbate employed. Further, it has been discovered that significant photocurrents accompany replacement of the organic adsorbate with an inorganic adsorbate that shares the reducible characteristic of active organic adsorbates. The range of applicable inorganic adsorbates preferably includes materials whose standard reduction potentials are smaller (more difficult to reduce) than that of oxygen at the same solution pH, i.e., below $E°=1.23$ V at pH 1.0. For purposes of illustration and not limitation, some examples are bromine ($E°=1.087$ V), iodine ($E°=0.536$ V), astatine ($E°=0.30$ V). In accordance with a preferred embodiment of the invention, as described below in Example II, Iodine ($I_2$) is used as the adsorbate.

Furthermore, it has been observed that silver iodide results on the surface of $I_2$-dipped silver electrodes. The formation of AgI during adsorption results from a thermodynamically-allowed coupling of silver oxidation and iodine reduction.

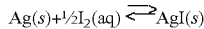

$Ag(s) + \frac{1}{2}I_2(aq) \rightleftharpoons AgI(s)$

Evidence of the presence of AgI(s) following the dip of roughened silver in $I_2$ is demonstrated by cyclic voltammetry (FIG. 18).

Reduction of AgI(s) appears as the first wave in the cathodic (negative) sweep of applied potential, followed by a wave accompanying reduction of dissolved oxygen. During the anodic return scan some reoxidation of silver to AgI(s) occurs, limited by availability of $I^-$ from solution following diffusion away from the surface. Photocatalyzed reduction of dissolved oxygen is not observed after electroreduction of the AgI(s) film. The adsorption of $I^-$ at electropositive silver adatom surface cites is best represented as $Ag_S$—I, with $Ag_S$ referring to the silver surface. The Raman stretching frequency of those $Ag_s$—I species is distinguishable from that for single crystal AgI.

A detailed surface Raman study of iodide (I⁻) adsorbed at a silver surface ["Low Temperature Resonance Raman Scattering from Iodide Adsorbed on Nanostructured Silver Surfaces" G. Chumanov, M. S. Sibbald, T. M. Cotton, *J. Phys. Chem. B* 102, 10836, 1998, which is incorporated by reference herein in its entirety] revealed that surface species that are best described as "$I_2$-like" where proximal adsorbed I⁻ ions join. Thus, $I_2$ adsorbed at silver can be considered as another way to describe I⁻ at silver, i.e. $Ag_S$—$I_2$ is equivalent to $Ag_S$—I. While AgI reduces with a single equivalent,

$$AgI(s)+1e \rightleftharpoons Ag°(s)+I^-(aq)$$

$Ag_SI_2$ reduction with a single electron yields the radical anion intermediate ($Ag_SI_2^-$) believed to be needed for catalytic delivery of reducing equivalents to oxygen.

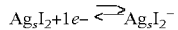
$$Ag_sI_2+1e- \rightleftharpoons Ag_sI_2^-$$

As such, and in accordance with a preferred embodiment of the invention, as described below in Example II, $I_2$ at Ag, identically described as AgI is used as the adsorbate.

Example I

Silver Electrode Having Bis-Pyridyl Acetylene ("BPA") Adsorbate

FIG. 3 depicts performance of bis-pyridyl acetylene ("BPA") as an adsorbate. Specifically, FIG. 3 depicts the surface enhanced Raman spectrum of BPA adsorbed at a silver electrode as a function of applied potential. An Argon ion (Ar⁺) laser was operated at 5145 Å and 50 mW to produce the resulting spectrum. The voltages in FIG. 3 are reported relative to a Ag/AgCl reference electrode in 0.1 M NaCl. The spectrum recorded at −0.10 Volts compares with the normal Raman spectrum of BPA, while the spectra observed in the range −0.50 to −0.90 Volts are assigned to the radical anion of BPA, i.e., BPA⁻. The assignment of the product of electroreduction of BPA to its radical anion was made after (1) comparing the cyclic voltammogram with potential-dependent changes in the observed surface enhanced Raman spectrum, (2) vibrational analysis of those spectral changes, and (3) recognizing that the spectrum reported at −0.10 Volts was recovered upon return to that voltage following a voltage excursion to −0.90 Volts.

The inset of FIG. 3 depicts a cyclic voltammogram of BPA at silver in a nitrogen-saturated, aqueous solution of BPA in 0.1 M NaCl. As can be seen, as the applied voltage is made more cathodic, electroreduction of BPA is observed, with concomitant changes in the observed surface enhanced Raman spectrum. Loss of intensity at 2230 cm⁻¹ (assigned to a symmetric stretch of the triple-bonded acetylene bridge) beginning at −0.5 volts (vs. Ag/AgCl), as the voltage moves negatively, signals loss of the triple bond upon electroreduction of BPA. The reduction is reversible, with triple bond 2230 cm⁻¹ line reappearing upon return to more anodic (less negative) voltages. The demonstrated reversibility excludes assignment of ethylenic or ethanic reduction products; both of which do not oxidize back to BPA in this voltage range.

These results direct assignment of the reduction product to the radical anion BPA(−). The stable radical-anion intermediate in the reduction of BPA signals the availability of a vacant energy level in neutral BPA that can be filled via a photon-driven metal-to-adsorbate electron transfer.

In further accordance with the invention, the adsorbate treated electrode surface is irradiated with light to photocatalytically reduce oxygen. When the BPA-covered electrode is irradiated in the presence of dissolved oxygen, the rate of oxygen reduction is increased even at applied voltages positive of both the BPA and the oxygen reduction potentials. This increase in oxygen reduction current upon irradiation of the cathode was observed by monitoring the cell current as a function of time while admitting light through a computer-controlled shutter. As shown in FIG. 4, the oxygen reduction current increased during the period that the shutter was open, allowing irradiation of the cathode.

Figure 4B:
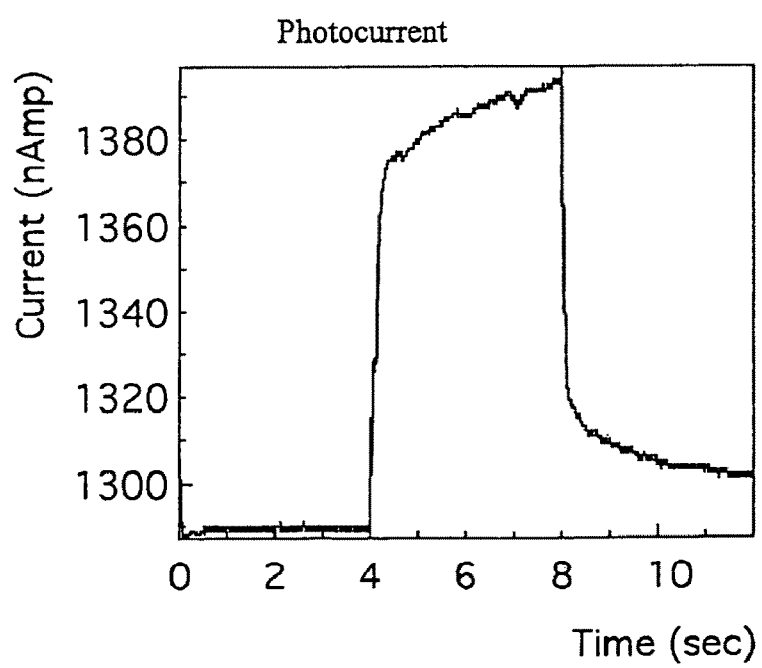
Figure 4C:
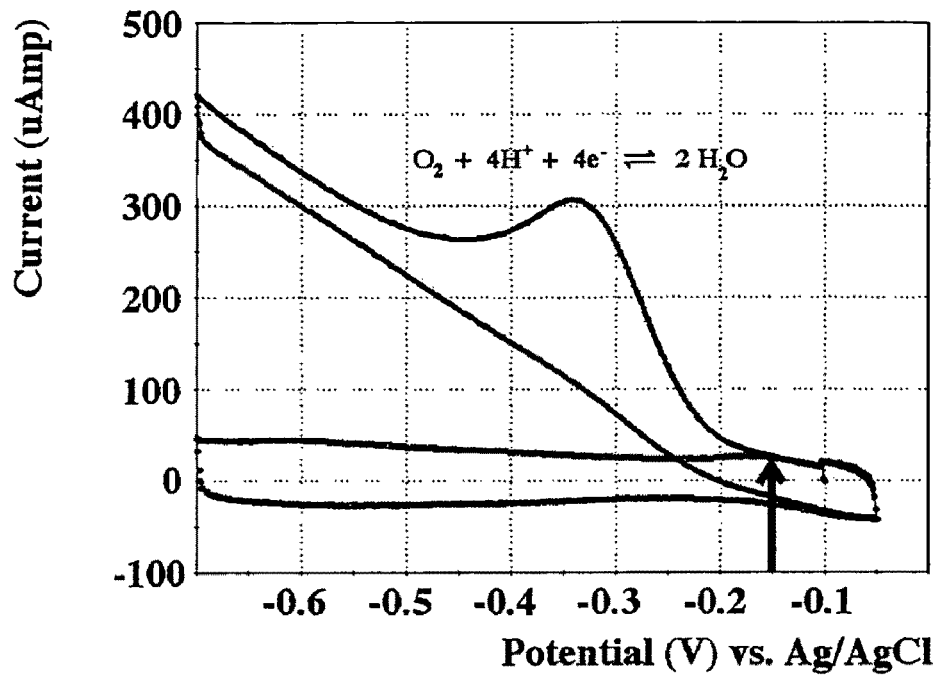
Figure 4D:
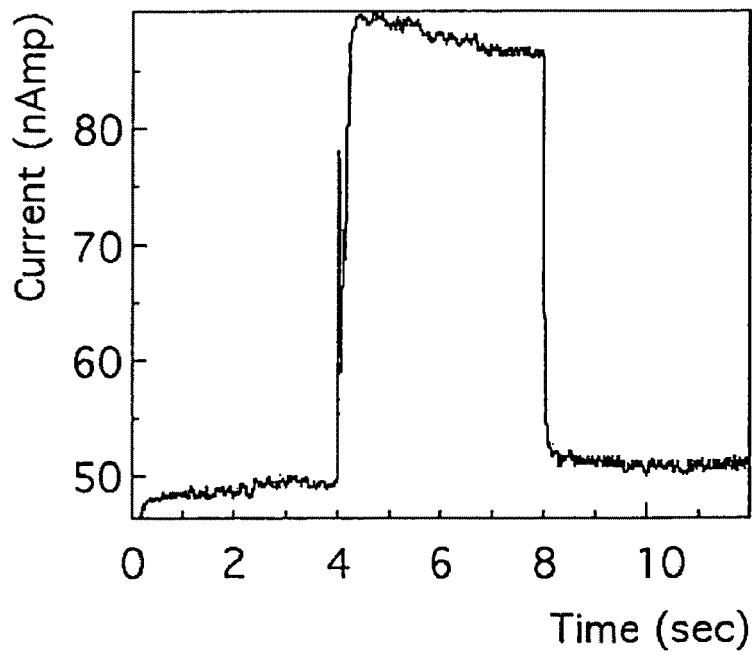

Cyclic voltammetry in the oxygen reduction region is depicted in FIGS. 4(A) and 4(C) for oxygen-saturated (upper curve) and nitrogen-saturated (lower curve) solutions of 0.1 M NaCl. With the potential held as indicated by the arrows in FIGS. 4(A) and 4(C), photocurrent measurements were made by opening a shutter allowing the laser light (5145 Å, 50 mW) to irradiate the BPA-covered surface (area≈0.11 cm²) between 4 and 8 seconds. As depicted in FIG. 4(B), at −0.25 V, where oxygen reduction proceeds uncatalyzed (note the increased baseline current), the photocurrent increased steadily while the light was on indicating warming by the laser. As depicted in FIG. 4(D), at −0.15 V, where oxygen reduction does not proceed without photocatalysis, the photocurrent remains steady or decreases while the light is on, in spite of surface warming by the laser. A low or non-existent energy barrier to the photo-assisted electron transfer is indicated by these results and highlights the catalytic advantage of the method. Voltages in FIGS. 4(A) and 4(C) are reported relative to the Ag/AgCl reference electrode in 0.1 M NaCl.

For purposes of illustration and not limitation, as embodied herein, light is applied to an adsorbate-covered electrode to generate electricity through the electrode when the electrode is exposed to oxygen, such as when the electrode is used as a cathode in an electrochemical fuel cell.

From the BPA surface enhanced Raman results reported herein, and the observations for stilbazole reported earlier, it is believed that absorption of light at this wavelength (5145 Å, Ar⁺) initiates photocatalysis by causing a metal-to-adsorbate electron transfer from the metallic (e.g., silver) substrate to the adsorbate. The result is a radical anion(−) adsorbate which readily gives up its excess electron to oxygen, considered the rate-determining step in oxygen reduction in a fuel cell. This photocatalytic electron transfer defeats the overvoltage limitations normally associated with electropositive metal electrodes by creating a negatively charged surface active site that acts as a source of electrons that are subsequently scavenged by oxygen.

It has been further discovered that the process of irradiating the surface warms the surface. This was observed (See FIG. 4) by noting that the current from uncatalyzed oxygen reduction (at its usual overvoltage) increases during the period of irradiation. As is well understood, the speed of reactions that are hindered by an activation energy barrier increases when those reactions are warmed. Conversely, the current associated with photocatalyzed oxygen reduction remains steady during long irradiation periods, in spite of the warming known to occur at the surface. These results are characteristic of reactions with little or no activation energy. Apparently, the transfer of electrons to oxygen via photo-induced electron transfer from the anionic adsorbate proceeds without any appreciable activation energy barrier, i.e., near perfect catalysis.

Because the photon-driven electron transfer couples metal and adsorbate electronic states, as described above, the appropriate range of photocatalytic excitation wavelengths is dependent upon both the metal substrate and the adsorbate used. For BPA adsorbed at silver, for example, excitation wavelengths shorter than 6000 Angstroms have been shown to be effective in photocatalysis of oxygen reduction as depicted in FIG. 5. More generally, as discussed elsewhere herein and with reference to FIGS. 14-15, excitation wavelengths between about 350 nm and about 650 nm can be effective in photocatalysis of oxygen reduction.

It can be expected for other metal-adsorbate systems that as the separation between the vacant adsorbate electronic state (defined by the adsorbate electron affinity; E.A.) and the filled metal electronic state (defined by the metal ionization energy; I.E.) gets smaller the threshold wavelength for photocatalysis (where $$\frac{hc}{\lambda_{threshold}} = I.E. - E.A.)$$

may advance further to the red or near infrared region of the spectrum. In accordance with one embodiment, visible light is used for the silver-BPA system. Preferably light having a wavelength shorter than about 6000 Angstroms can be used to irradiate the electrode. In accordance with one embodiment of the invention, light having a wavelength of 5145 Angstroms is provided using an Argon ion laser. Other light sources, including sunlight, can also be used.

That the photocatalyzed reduction of dissolved oxygen can be sustained so long as the oxygen supply is refreshed is shown in FIG. 6. For purposes of illustration and not limitation, a BPA-covered silver electrode was irradiated with 5145 Å light while continuously bubbling oxygen through the cell for a ten minute period during which the oxygen reduction current attained a steady state level after initial concentration polarization. The photocurrent reached a steady state that is proportional to the rate at which bubbled oxygen reached the electrode over time.

The photocatalysis has been further discovered not to be limited to oxygen reduction alone but to extend to other reducible material in solution. For purposes of illustration and not limitation, the electroreduction curves for oxygen [$O_2$, (—)], potassium ferricyanide [$K_3Fe(CN)_6$, (...)], iodine [$I_2$, (———)], and bis-1,2-(4-pyridyl)acetylene [BPA, (- - -)] are compared in FIG. 7. An Ag/AgCl reference electrode was used in conjunction with obtaining the results depicted in FIG. 7.

Concomitant photocatalysis of the reductions of oxygen, iodine, and potassium ferricyanide at BPA-covered silver are shown in FIG. 8. Specifically, FIG. 8 depicts measurements of photocurrent associated with reduction of oxygen (0.1 M NaCl solution saturated initially by bubbling $O_2$ but bubbling was stopped during measurement), iodine ($5\times10^{-4}$ M in 0.1 M NaCl), and ferricyanide ($1\times10^{-3}$ M in 0.1 M NaCl). Dissolved oxygen was scrubbed from the solutions of iodine and ferricyanide by bubbling nitrogen gas through the electrolyte for 30 minutes prior to measurement then the bubbling was stopped just before measurement. The silver working electrode (0.15 cm² area) was anodized ex-situ in 0.1 M NaCl for 50 mC per cm² at +0.15 V (vs. Ag/AgCl) then returned to ±0.15 V for the purposes of preroughening. The silver was then dipped in a $5\times10^{-4}$ M BPA solution for 10 minutes to adsorb BPA to the silver surface. Excess solution and non-adsorbed BPA were then removed by rinsing in distilled water prior to admission to the electrochemical cell.

That the observed photocurrent is a direct result of reduction of solution species is confirmed by correlation between the rates of drop-off in the current during the irradiation period, corresponding to concentration polarization and diffusion limited current, and the relative diffusion coefficients of oxygen, iodine, and potassium ferricyanide. As depicted in FIG. 8, the more rapid decay in photocurrent during irradiation correlated with the smaller diffusion coefficient of the reductant.

Example II

Iodine Adsorbate Applied to Silver Electrode i. Preroughening Silver Electrode Followed by Adsorption of $I_2$ As depicted in FIG. 9, irradiation of an iodine adsorbate-covered silver electrode caused immediate and sustainable reduction current when oxygen was continuously bubbled through an experimental cell.

In FIG. 9, the silver working electrode (0.15 cm² area) was anodized ex-situ in 0.1 M NaCl for 50 mC per cm² at +0.15 V then returned to −0.15 V for the purposes of preroughening. The silver was then dipped in a $5\times10^{-4}$ M aqueous $I_2$ solution for 10 minutes to adsorb iodine to the silver surface. Excess solution and non-adsorbed $I_2$ were then removed by rinsing in distilled water prior to admission to the electrochemical cell. (5145 Å Ar⁺, 100 mW, oxygen saturation maintained by bubbling $O_2$ through the 0.1 M NaCl electrolyte, V=−0.075 V).

The inset of FIG. 9 depicts the photocurrent measurement during the light off/on/off cycle. The cyclic voltammetry (□: light off, ·:light on) reveals reduction of oxygen at least 0.2 V more positive with the light on.

The extent of the catalysis, with oxygen reducing better than 0.2 volts more positive at the irradiated electrode than at the dark electrode (FIG. 9), when applied to technologies such as fuel cells, would be equivalent to an increase in efficiency from 65% to better than 81%. It is again believed that absorption of light of wavelength 5145 Å initiates photocatalysis by causing a metal-to-adsorbate electron transfer from the silver substrate to the adsorbate. The result is a radical anion(−) adsorbate, $I_2^-$ in the case of iodine, which readily gives up its excess electron to oxygen accelerating what is considered the rate-determining step in oxygen reduction.

ii. Oxidizing a Polished Silver Electrode in Iodide Solution

Acknowledging that, the system of $I_2$ adsorbed at silver (Example II) can be equally described as AgI, a silver surface was alternatively prepared by anodizing a freshly polished silver electrode in a 0.1 M solution of potassium iodide passing 1 mC of anodic charge (5 mC per cm² electrode area). Instead of reversing the silver oxidation, as in a typical oxidation/reduction cycle used to roughen a silver electrode surface, the oxidation was stopped by taking the cell out of circuit. The AgI-coated silver electrode was then rinsed and moved to the 0.1 M $NaClO_4$ solution for photocurrent measurements. Thus the electrode was prepared without preroughening or dipping in an adsorbate solution.

The interface between the bulk silver surface and the AgI film may be regarded as I⁻ (or $I_2$) adsorbed at adatom silver roughness features, features that were found to be equivalent to Ag⁺ sites in the Stilbazole report discussed above. The photocurrent of the electrode is shown in FIG. 19.

The AgI-covered silver electrode shows effective photocatalysis of oxygen reduction equivalent to that for $I_2$-covered silver. The steady state photocurrent attained at long illumination times and the increase in the photocurrent on moving from air- to $O_2$-saturated solutions preclude assignment of the response to illumination purely to photoreduction of the silver halide, a process well known in photography.

Without being bound by theory, it is believed that the first step in the mechanism of transfer of electrons to oxygen is likely the photoreduction of $Ag^+I^-$, or, acknowledging the "$I_2$-like" nature of $I^-$ at the silver surface, $Ag_S$—$I_2$ at the film/metal interface to $Ag_S$—$I_2^-$ via electron transfer from the silver metal. The resultant radical anion $Ag_S$—$I_2^-$ is readily reoxidized back to $Ag_S$—$I_2$ by coupling with the reduction of oxygen diffusing to the surface. The process is then repeated in the attainment of steady state photocurrent. The following reaction scheme is proposed for photocatalyzed reduction of oxygen at AgI-covered silver:

(1)

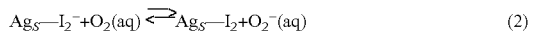

(2)

Again, analogous to the photocatalysis at BPA-covered silver, reduction of dissolved oxygen is catalyzed by delivery of the first reducing equivalent to oxygen in the rate determining step. FIG. 20 shows the degree to which oxygen overvoltage is lowered at AgI-covered silver upon illumination compared to the onset voltage for oxygen reduction in the dark.

Oxygen (and AgI) commence reduction near +0.35 V in the dark. Upon illumination, we observe oxygen reduction at potentials nearly 400 mV anodic of where oxygen reduces in the dark. The anodic range is limited only by the oxidation of silver in perchlorate (onset voltage near +0.74 V vs. RHE), i.e., at voltages comparable to the onset voltage for oxygen reduction at platinum. That the photocurrent is associated with oxygen reduction is assured by the subsequent study in nitrogen-saturated (oxygen-free) electrolyte during illumination and its ready comparison with the cyclic voltammogram recorded in the dark.

The result in this Example II, and in Example I, while clearly overcoming the overvoltage limitations of electropositive metal electrodes, reveals comparatively modest increases in electroreduction current, as depicted for example in FIG. 9, owing to the limited number of active sites at surface of the bulk silver electrode used in these experiments. These results are not unlike the limitations associated with platinum dispersion at graphite. It can be expected that photocatalyzed electroreduction current levels will increase at electrodes that support a greater number of surface active sites (e.g., adatoms or clusters of adatoms). As discussed in the Stilbazole report, these sites are believed to be $Ag^+$ surface sites. It is an object of the invention to provide increased numbers of surface sites to support generation of greater amounts of electric current. As mentioned above, "Silver Metal Filter Membranes" available from Sterlitech™ Corporation (22027 70th Ave. S., Kent, Wash. 98032-1911 USA, Tel: 877-544-4420; www.sterlitech.com) offer such a surface. A 47.0 mm diameter silver membrane of 0.0508 mm thickness with an average pore size of 0.2 μm supports an effective surface area of 54,300 cm$^2$, compared to an apparent surface area [$\pi r^2 = \pi \times (4.70/2)^2$ cm$^2$] of 17.3 cm$^2$. In this report we have demonstrated (FIG. 9) photocurrents of 6 uAmp at a bulk silver electrode surface area of 0.15 cm$^2$, or photocurrent densities of 40 uAmp/cm$^2$. Scaling up to the effective surface area of the 47 mm diameter (0.2 μm pore size) silver membrane allows prediction of possible photocurrent densities of better than 0.2 Amp per effective surface area, or (0.2 Amp/17.3 cm$^2$=) 12.5 mAmp per cm$^2$ of apparent surface area). In a recent U.S. Department of Energy (DOE) Funding Opportunity Announcement entitled "Research and Development of Fuel Cell Technology for the Hydrogen Economy" [Announcement DE-PS36-06GO96017.] DOE established the 2010 Technical Target for the specific activity of fuel cell electrocatalysts (Table 2 in the DOE Announcement) at 0.720 mAmp/cm$^2$. As will be recognized by those of skill in the art, the prediction above (12.5 mAmp/cm$^2$) relies upon assumptions of adequate access of adsorbate and light to the available surface area.

Example III

Expansion of Excitation Wavelength Using Bis-Pyridyl Ethylene ("BPE") Adsorbate

In order to expand the excitation wavelength range beyond the laser wavelengths available (FIG. 5) and to thereby further the understanding of the role played by light in the catalysis of oxygen reduction it was experimentally arranged to excite photocurrents with a broadband xenon arc light source. The resultant photocurrents observed as a function of excitation wavelength, i.e., what is referred to as the action spectrum, were then compared with an extinction spectrum gathered using a modulated electroreflectance technique.

Figure 13:
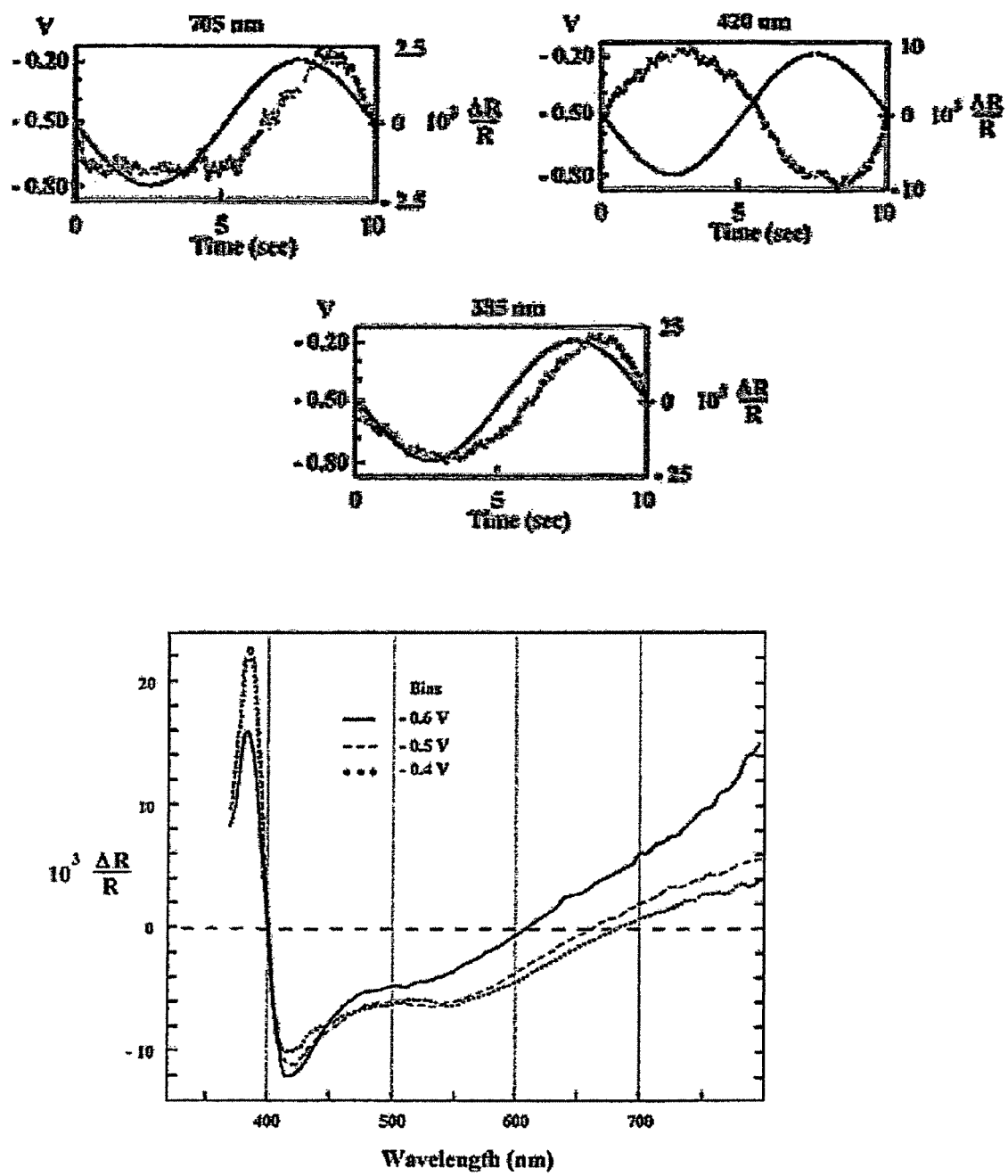
FIG. 13 depicts the modulated electroreflectance spectrum of [bis-(4-pyridyl)-ethylene]-covered silver ("BPE") recorded at bias voltages of −0.4, −0.5, and −0.6 volts vs. Ag/AgCl reference. Included above the full spectrum are examples of the voltage modulation and resultant change in reflectivity observed at select wavelengths. The smooth sinusoidal curve represents the applied modulation to the voltage, ±0.300 volts about the bias. The dotted curve is the normalized change in reflectivity (DR/R) from the silver electrode in response to the modulation.

FIG. 13 depicts the modulated electroreflectance spectrum for this other adsorbate, bis-(4-pyridyl)-ethylene ("BPE") adsorbed at a silver electrode surface. The modulated electroreflectance of neither BPA nor $I_2$ can be gathered in the voltage range studied (−0.9 V to 0.1 V vs. Ag/AgCl reference electrode) because these materials are both electroactive in this voltage range (that is to say, they reduce). BPE, on the other hand, does not reduce until about −1.2 volts (vs. Ag/AgCl reference), outside of the stated voltage range. BPE, however, can be expected to behave similarly to BPA in its binding to the silver surface through the terminal nitrogen atoms.

The modulated electroreflectance spectrum is recorded on a Cary 219 UV-vis spectrophotometer by tracking changes in reflected light intensity from the adsorbate-covered surface during the modulation of the applied voltage. Surface sensitivity is accomplished with this voltage modulation technique. In operation, visible and ultraviolet light penetrate hundreds of angstroms into the silver electrode leaving reflectivity measurements alone not surface sensitive. However, voltage modulating adjusts the charge density within the first 1-2 Å of the electrode surface. Thus, changes in the reflectivity that accompany voltage modulation are attributable to the surface region of the silver electrode, as opposed to the bulk of the electrode.

The applied voltage was modulated sinusoidally by ±0.300 volts about a bias voltage of about ±0.4, −0.5, and −0.6 volts. Certain actual measurements made at select wavelengths at the −0.5 bias voltage are presented in FIG. 1 for purposes of illustration. The accompanying change in reflectivity (ΔR), normalized to the total reflected light intensity (R), i.e., (ΔR/R), is reported as a function of wavelength in FIG. 1. As depicted, the electroreflectance spectrum takes on a derivative shape, crossing zero at a maximum (or minimum).

The modulated electroreflectance spectrum of FIG. 13 clearly depicts the familiar surface plasmon resonance near 400 nm observed by many silver researchers. In addition, a weaker derivative feature in the 450-600 nm wavelength range is also observable.

Figure 14:
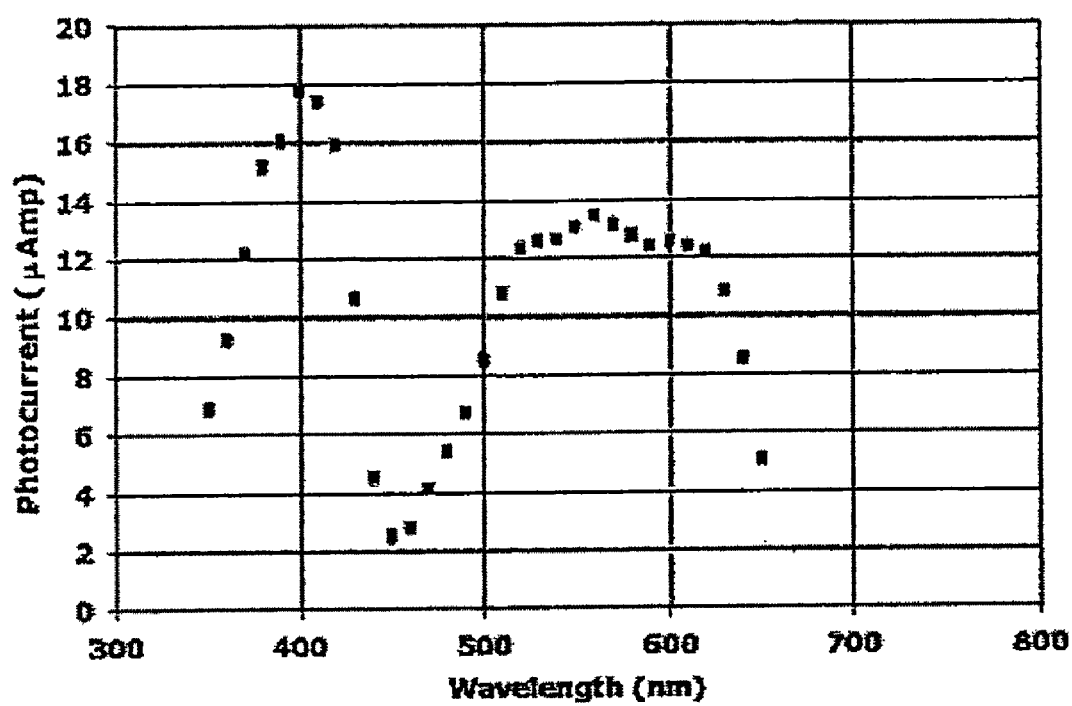
FIG. 14 depicts oxygen reduction photocurrent vs. wavelength at an iodine-covered silver electrode. Currents are corrected for variations in the power of the Xenon lamp with wavelength and normalized to 100 mW per surface area of 0.196 $cm^2$.

The observed oxygen reduction current (the "photocurrent") at $I_2$-covered silver is plotted as a function of excitation wavelength to yield the action spectrum depicted in FIG. 14. As depicted, the photocurrent has a maximum proximate the surface plasmon resonance at 400 nm for silver. Moreover, a second maximum in the 500-600 nm range in FIG. 2 matches the weak derivative feature in the same region of the modulated electroreflectance spectrum.

Figure 15:
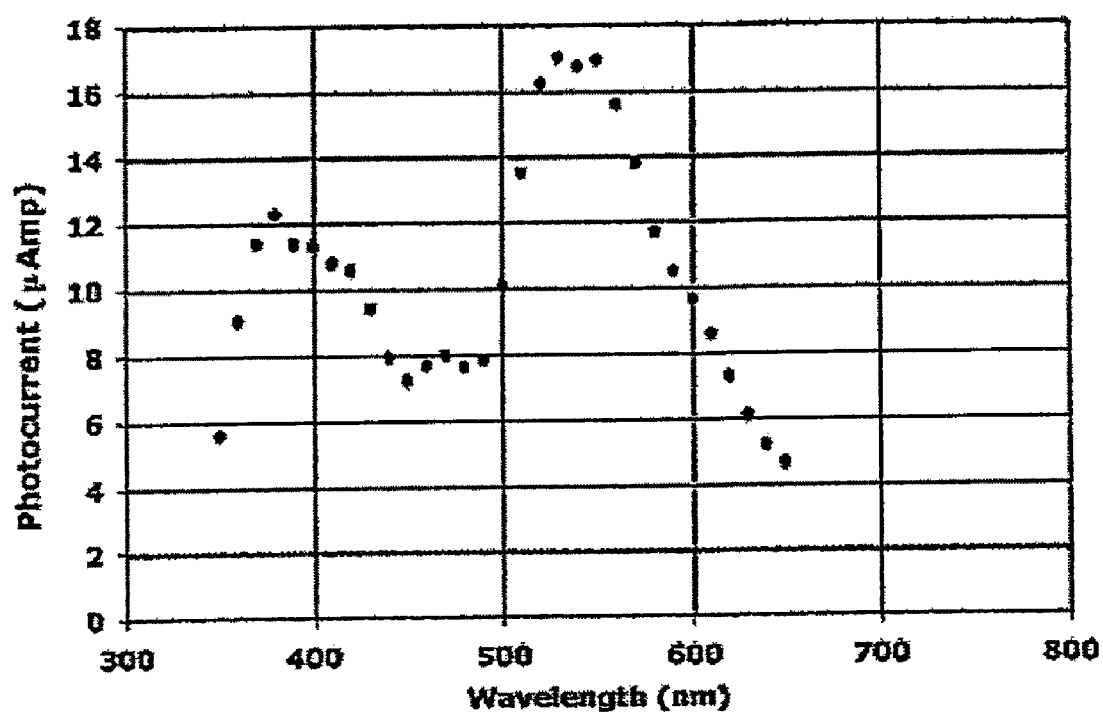
FIG. 15 depicts oxygen reduction photocurrent vs. wavelength at a BPA-covered silver electrode. Currents are corrected for variations in the power of the Xenon lamp with wavelength and normalized to 100 mW per surface area of 0.196 $cm^2$.

The photocurrent at BPA-covered silver is similarly plotted as a function of excitation wavelength yielding the action spectrum depicted in FIG. 15. Again, a peak near 400 nm corresponds to the surface plasmon resonance for silver, and a second peak in the 500-600 nm range is similarly observed.

The experimental conditions for generating the data presented in FIG. 14 and FIG. 15 is as follows. A silver electrode (0.196 cm$^2$) was electrochemically cleaned by polarizing the electrode to −1.8 volts vs. Ag/AgCl in a 3.3M KCl, pH 1.4 solution for 15 minutes. In the same solution, the electrode was then subjected to three consecutive oxidation reduction cycles from −0.300 volts to +0.200 volts and back to −0.300 volts with the passage of −10 millicoulombs charge during the anodic sweep to +0.200 volts each time. The relatively high (3.3M) concentration of chloride helps ensure the absence of edge effects during the anodic step that normally accompanies oxidation in lower concentrations of electrolyte. The pH was set low (1.4), by addition of HCl, to ensure thorough cleaning at −1.8 volts with vigorous generation of hydrogen gas accompanying the reduction of acidic protons at that voltage according to the reaction:

$$2H^+ + 2e^- \rightleftarrows H_2(g) \tag{1}$$

Subsequent to these cleaning and roughening cycles, the silver electrode was removed from the solution and dipped in a 0.1 M aqueous NaCl solution (pH 6.86) that was saturated in BPA or $I_2$. The electrode was left in the dip solution overnight. In particular, Applicant has discovered that it is possible to improve the photocurrent signal from BPA-adsorbed silver to levels comparable to those observed for $I_2$-adsorbed silver, by elongating the dip period and by lowering the pH of the solution used for photocurrent measurements.

After the overnight dip procedure, the silver electrode was placed in a 0.1 M NaCl solution (pH 2.20) and the photocurrent response measured.

The photocurrent excitation profiles for $I_2$— (FIG. 14) and BPA-covered (FIG. 15) silver are defined by two features that correlate well with features in the electroreflectance spectrum. A distinct peak near 400 nm, in the photocurrent profiles for both adsorbates, coincides with the silver surface plasmon resonance observed in the electroreflectance spectrum. The second feature in the photocurrent excitation profile occurs in the 500-600 nm region for both adsorbates and compares with the weaker derivative feature in the electroreflectance spectrum in the same region. Equivalent features in Raman excitation profiles and absorption spectra of small silver colloids have been observed in this region by other researchers in the field. The similarity of the profiles for the two very different adsorbates, BPA and $I_2$, at surfaces that were subjected to identical electrochemical roughening prior to admission of the adsorbate, and comparison to colloid and surface plasmon spectra suggest the roughness features of the surface itself are largely responsible for the light absorption properties.

The 400 nm peak in the action spectrum of both adsorbates reveals the effectiveness of the silver surface plasmon in coupling to photoemission of electrons that are subsequently scavenged by dissolved oxygen. Surface roughening allows some of the hot electrons excited by decay of the surface plasmon to satisfy the conservation of momentum constraint and travel along the surface normal ejecting into solution. Similar correspondence between photocurrent maxima and surface plasmon resonance has been reported for photocurrents that accompany the scavenging of photoelectrons by carbon dioxide and nitrite.

Even more interesting is the apparent resonance between the photocurrent for oxygen reduction and the weak extinction feature in the electroreflectance spectrum between 500 and 600 nm. Oxygen reduction photocurrents equivalent to, or exceeding those observed in resonance with the surface plasmon at 400 nm are observed in this region of the "action" spectrum in spite of its weak extinction in the electroreflectance spectrum. Broadening of the surface plasmon resonance upon surface roughening has been cited as the source of photocurrents accompanying $CO_2$ scavenging observed with wavelengths in 500-600 nm region. However, the observations described herein of disproportionately large oxygen reduction photocurrent within this region of weak electroreflectance extinction, compared to photocurrents observed near the intense surface plasmon absorption at 400 nm, may suggest a distinctly more effective mechanism of photoemission excitation with wavelengths between 500 and 600 nm. Because its propagation vector is parallel to the surface normal a metal-to-adsorbate charge transfer may be expected to be intrinsically more effective at delivering electrons to available reductants than that fraction of hot electrons from a decaying surface plasmon that happen to also run parallel to the surface normal.

The attribution of the 500-600 nm feature in the photocurrent profiles and the electroreflectance spectrum to a metal-to-adsorbate charge transfer is further supported by changes in the electroreflectance spectrum with bias voltage. While the surface plasmon resonance near 400 nm is not expected to shift with bias voltage, unless that voltage leads to surface reconstruction, a charge transfer resonance would be expected to shift with bias voltage. The wavelength of a metal-to-adsorbate charge transfer excitation will move with bias voltage. The work function of the metal, $\Phi(v)$, i.e., the energy required to remove an electron from the metal, depends on the voltage, increases with more positive bias. In other words, it becomes more difficult to remove an electron from the metal the more positive it becomes. Moving an electron from the metal to the adsorbate requires addition of energy equal to the work function, to first remove the electron from the metal, while recovering the adsorbate electron affinity (E.A.) energy upon capture by the adsorbate: $hc/\lambda = \Phi(v) - E.A.$ As the bias voltage becomes more positive, from −0.6 to −0.5 to −0.4 volts, the wavelength of a metal to adsorbate charge transfer excitation will elongate. Evidence of a shift of the 500-600 nm feature to longer wavelengths with more positive bias voltage is clearest in the 400-450 nm region of the electroreflectance spectrum. There, loss of the electroreflectance signal in moving from −0.4 to −0.6 volts accompanies shift of the resonance in the 500-600 nm region to longer wavelength, i.e., to the right in FIG. 13.

Figure 16:
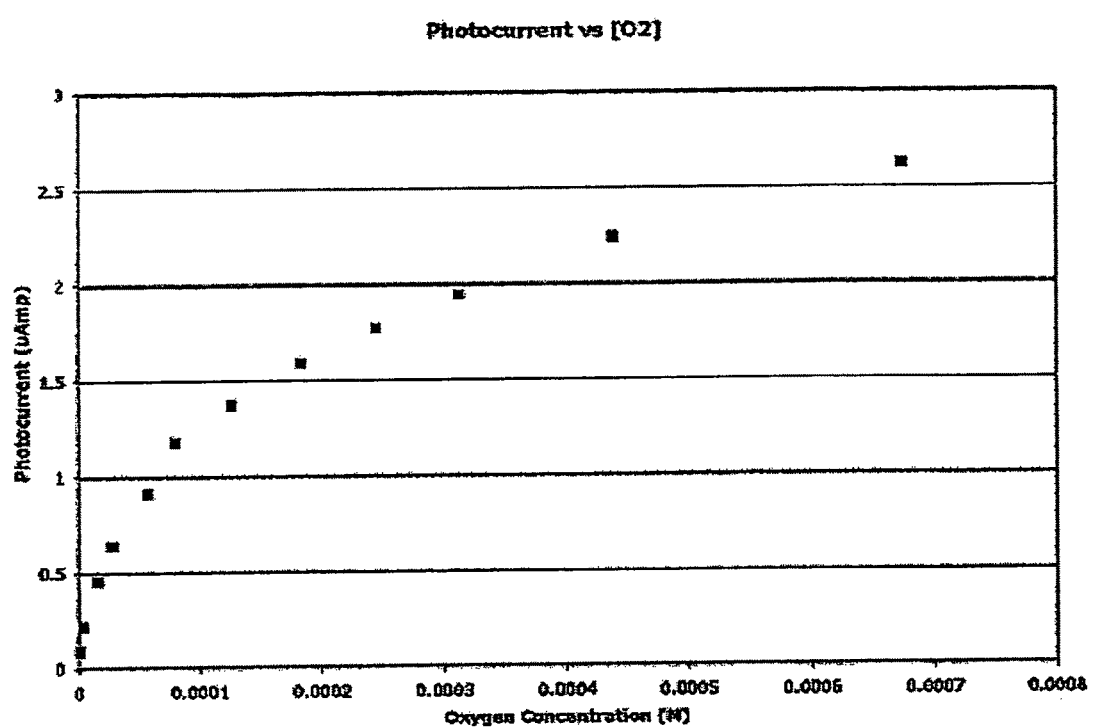
FIG. 16 is a plot of observed oxygen reduction photocurrent as a function of oxygen content of a solution for a BPA coated silver electrode.

To further confirm the dependence of observed photocurrents on the oxygen content of the supporting electrolyte, photocurrents at various dissolved oxygen concentrations were measured. FIG. 16 is a plot of the observed oxygen reduction photocurrent as a function of the oxygen content of the solution for a BPA-coated silver electrode. The oxygen content was measured with a dissolved oxygen meter (Hach model sensIon6 meter) and converted to molar (M) concentration. FIG. 16 demonstrates the prerequisite of dissolved oxygen to the observation of photocurrent in that the photocurrent goes to zero when the oxygen content does.

With the BPA-coated silver prepared as defined above the solution was saturated with oxygen by bubbling pure oxygen through the solution for about one hour. After an hour of $O_2$ bubbling, the oxygen concentration reported by the Hach meter was 0.0302 mg/L (9.4×10$^{-4}$ M). This value dropped to 0.0216 mg/L (6.74×10$^{-4}$ M) about 5 minutes after bubbling ceased. This is typical behavior for oxygen electrodes that depend upon diffusion of oxygen to the electrode, wherein diffusion is enhanced while the solution is agitated during bubbling. With a steady state oxygen concentration attained ($6.74 \times 10^{-4}$ M) the photocurrent was measured by admitting 5145 Å (Ar+) laser light onto the surface in a shuttered pattern (4 seconds off, 4 seconds on, 4 seconds off). The solution was then subjected to a brief bubbling of nitrogen gas to lower the concentration of dissolved oxygen. The bubbling of the nitrogen gas was then turned off and the oxygen concentration reading at the Hach meter was allowed to stabilize (about 1 minute) at a new lower value ($4.39 \times 10^{-4}$ M) and the photocurrent measurements were repeated. The process was continued until the oxygen content reached its minimum value ($2.87 \times 10^{-7}$ M).

Figure 17:
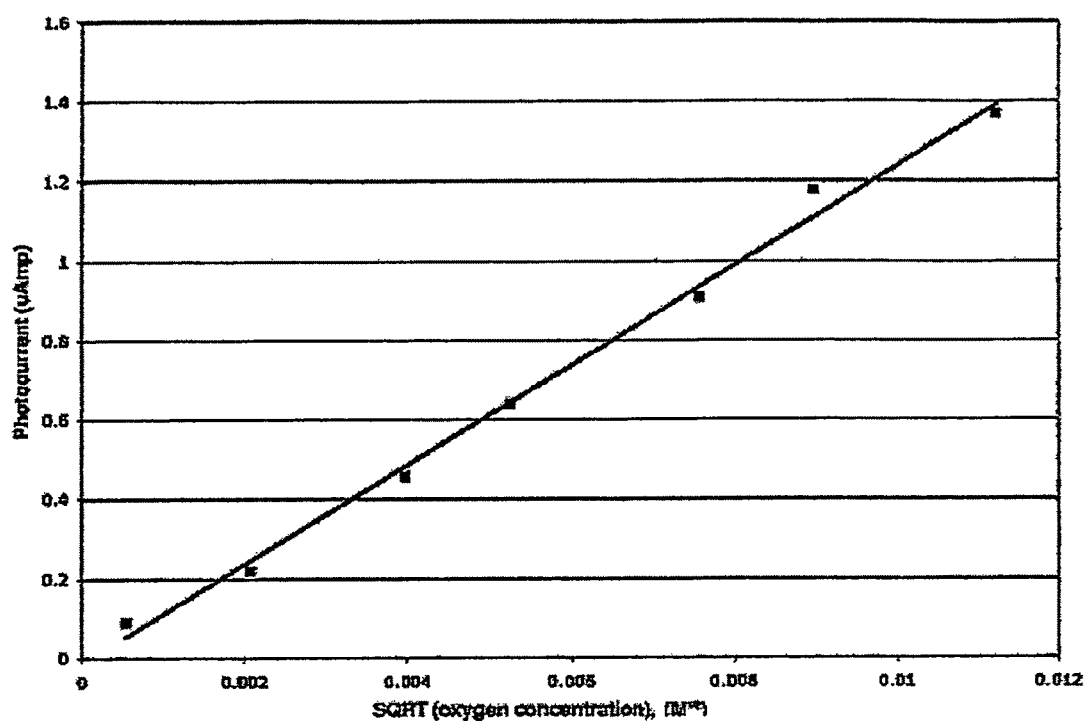
FIG. 17 is a plot of observed oxygen reduction photocurrent as a function of the square root of the oxygen content of the solution for a BPA coated silver electrode.

FIG. 17 plots the photocurrent measurements made at low oxygen concentration in FIG. 16 vs. the square root of the concentration. A linear relationship identifies the dependence of the rate of the photocatalyzed oxygen reduction reaction (the photocurrent) on $\sqrt{[O_2]}$. The square root dependence on oxygen concentration at low concentrations (below saturation) is expected for photoemission where some of hydrated photoelectrons are scavenged by oxygen while some return to the electrode. Similar square root dependence of photocurrent on scavenger concentration has been observed for the reduction of nitrite at silver.

Fuel Cell Construction

Photocatalysis using an adsorbate-covered electrode made from a material such as silver thus presents a promisingly efficient alternative to the requirement for expensive platinum catalysts at fuel cell cathodes.

In further accordance with the invention, adsorbate treated electrodes as described herein can be used to construct a novel fuel cell structure for producing electric power.

For purposes of illustration and not limitation, embodiments of a fuel cell structure are described herein. Fuel cells as described herein bear a number of similarities to those known in the art. However, there are certain unique differences.

Contemporary fuel cells hide the cathode below a graphite gas distribution layer, a layer that serves as the cathode terminal while uniformly distributing oxygen to the entire surface of the cathode and managing removal of water generated in the reaction. Primarily, a fuel cell as described herein requires irradiation of the cathode to operate. Since the cathode must be irradiated, the gas distribution layer common to fuel cells known in the art must be modified or removed in favor of access of light to the cathode such as via an optical flat glass or other transparent or light conducting material.

Further, modern fuel cells make use of porous graphite paper (or cloth) that supports the dispersed platinum catalyst. The porous graphite serves as the throttle necessary to maintain a liquid/gas interface between an electrolyte, such as a proton exchange membrane (PEM) solid electrolyte layer, and the oxygen gas. Diffusion of protons through the graphite pores, into the PEM layer, and across to the cathode completes the circuit. The cathode of a fuel cell described herein differs from those known in the art by being made from a conductive material including an adsorbate applied thereto as described above. In accordance with one embodiment, a porous photocatalytic material such as silver is employed that doubles as a gas distribution layer and cathode terminal.

While conventional PEM (proton exchange membrane) fuel cells operate near 80° C. to accelerate the reaction kinetics, a photocatalytic fuel cell made in accordance with the teachings herein can operate optimally at ambient temperature (e.g., 75° F.).

Silver can be manufactured, actually covalently synthesized, to form porous membrane filters. These filters can thus serve as the catalyst (when irradiated), and as a porous support of the oxygen-PEM interface. Pores of diameter greater than the wavelength of light used to irradiate the cathode can serve as light pipes deep into the porous silver membrane and increasing the active surface area. There is no need for a gas distribution layer since the porous silver layer is a metal that easily serves as the cathode terminal.

In accordance with the teachings herein, a fuel cell is operated by admitting oxygen gas into a cavity between the (e.g., silver) membrane and the light source needed for irradiation of the adsorbate coated silver cathode. The porous membrane can also provide an exceptionally large surface area to support large numbers of surface active sites.

Figure 10C:
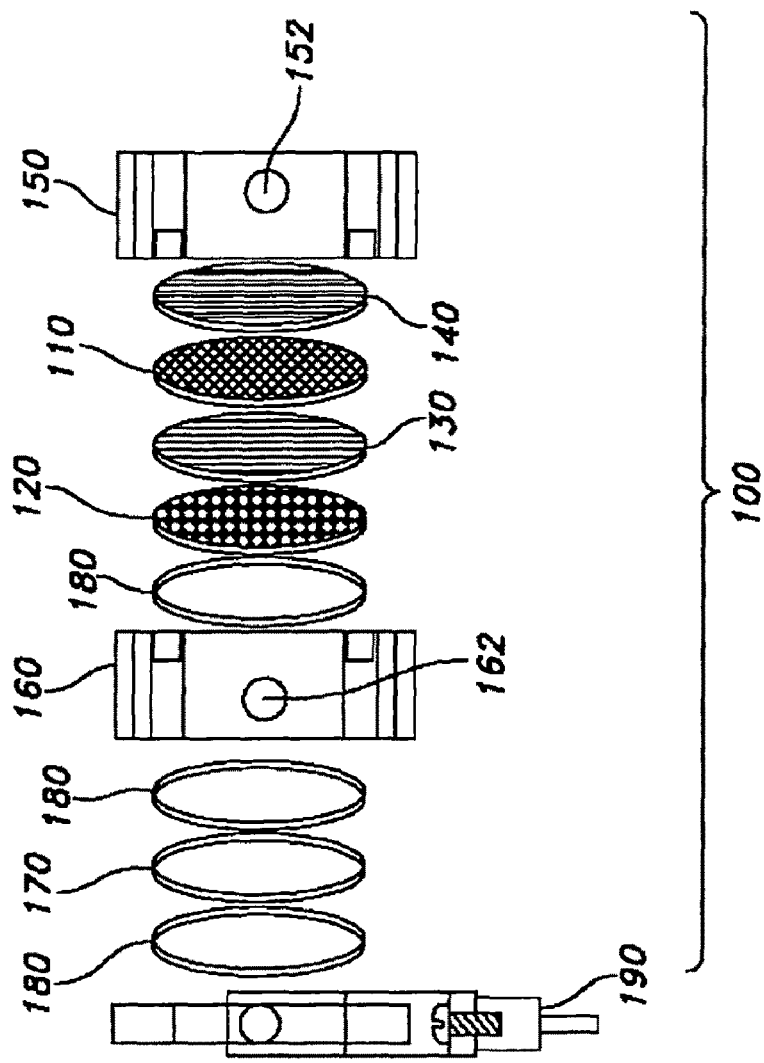
FIGS. 10A-10C depict plan, top and exploded side views, respectively, of an exemplary embodiment of a fuel cell made in accordance with the present invention.
Figure 10A:
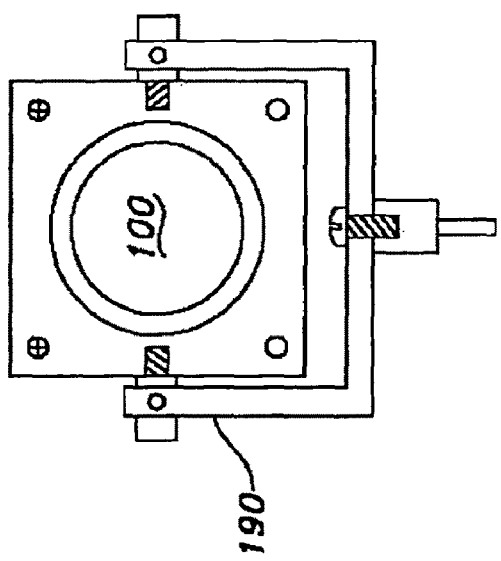
Figure 10B:
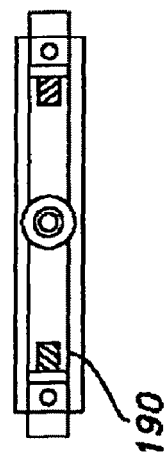

An exemplary embodiment of a fuel cell made in accordance with the teachings herein is depicted in FIGS. 10(A)-10(C). As depicted, fuel cell 100 is adapted and configured to fit into the sample chamber of a Jobin Yvon U1000 Raman Spectrometer to facilitate laser irradiation of the cathode and testing. As depicted, fuel cell 100 includes an anode 110, a porous silver cathode 120, a proton exchange membrane 130, a graphite gas distribution layer 140 proximate the anode 110, and first and second metallic end plates 150, 160 including a hydrogen gas port 152 and an oxygen gas port 160. An optical flat glass 170 is also provided which, when irradiated with a laser, directs light toward cathode 120 to initiate photocatalysis. A plurality of o-rings 180 are provided for sealing. An aluminum mount 190 is provided into which fuel cell 100 is mounted. Humidified reactant gases are piped into fuel cell 100 with the flow rate and pressure controlled by a back-pressure regulator (not shown). Electrical leads (not shown) are attached to the anode 110 and cathode 120, respectively, of fuel cell 100 for conducting electricity produced to a load (not shown).

Proton Exchange Membrane 130 can be a Dupont Nafion™ 115 PEM (available from DuPont Fuel Cells, Fayetteville, N.C., U.S.A.), for example, to allow for proton transport between the silver cathode 120 and the Platinum (Pt)/carbon anode 110. The PEM is sandwiched between the cathode 120 and anode 110 and eliminates the need for a supporting electrolyte solution.

After surface preparation, the silver cathode is treated with adsorbate by dipping into a solution containing any of numerous adsorbate molecules that have previously shown photocatalytic behavior, such as iodine.

The 10% Pt/carbon catalyst of anode 110 serves as a traditional catalyst for the hydrogen oxidation side of the cell. In accordance with one embodiment, the 10% Pt/carbon catalyst can be painted on one side of the PEM 130 and the carbon paper gas (hydrogen) diffusion layer is disposed on top of the painted side of the PEM 130. The opposite side of the PEM 130 is then painted with a thin film of DuPont™ Nafion® PFSA (perfluorosulfonic acid/PTFE copolymer) (also available from DuPont Fuel Cells, Fayetteville, N.C., U.S.A.) polymer dispersion and the silver membrane cathode 120 is pressed into this dispersion. As depicted, the whole layered structure is mounted in a cell 100 that permits laser irradiation of the silver membrane cathode.

A Spectra Physics Model 2020-05 argon ion laser, for example, can be used as a wavelength-selectable, directional light source for testing the photocatalytic response of the silver membrane cathode. The photocatalytic behavior of the modified silver membrane can be confirmed in the potentiostatic mode of a Princeton Applied Research Model 263A potentiostat/galvanostat. The assembled fuel cell 100 can then be tested in galvanostat mode whereupon the current/ potential behavior can be recorded as a function of laser wavelength and power, surface modification, and reactant gas pressure.

Figure 11:
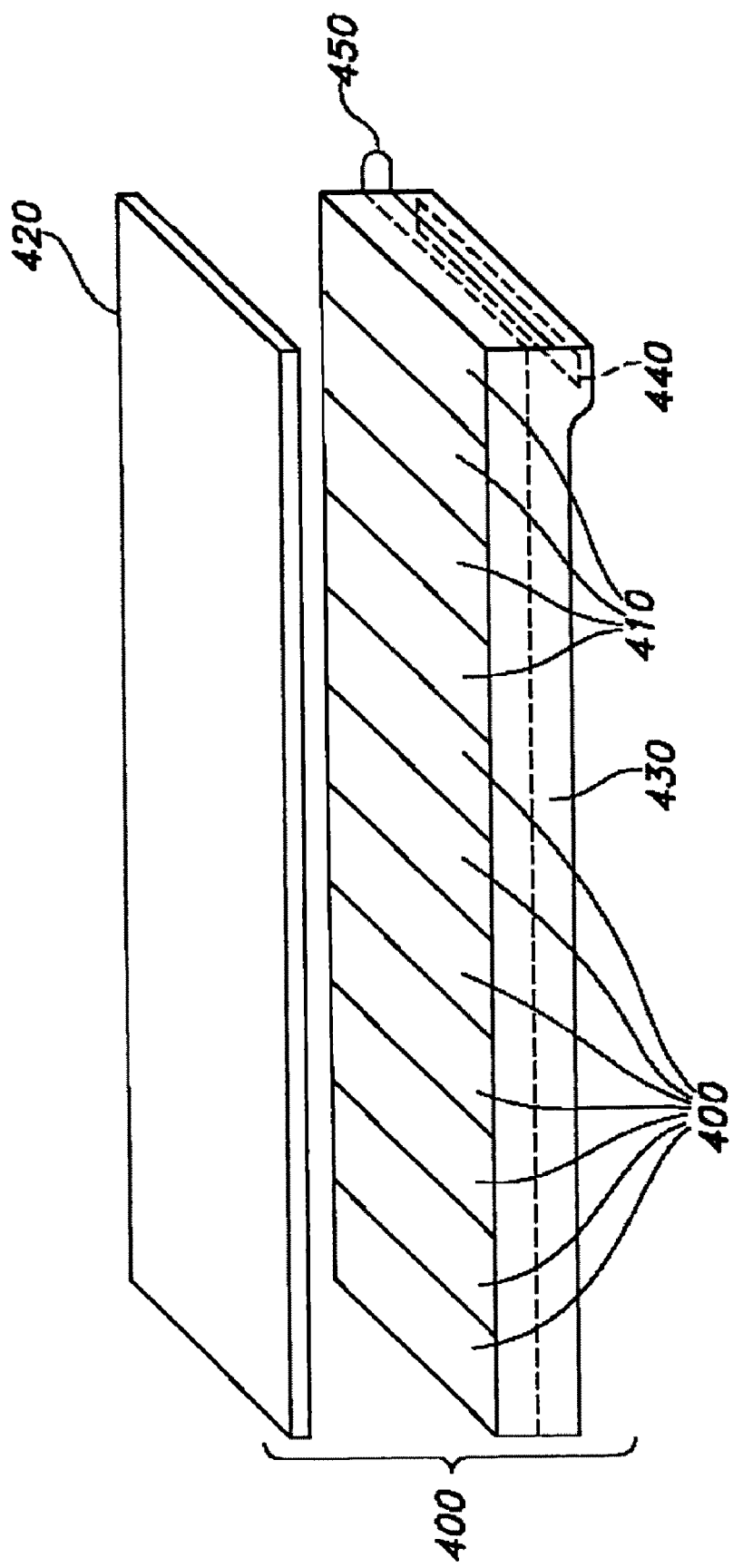
FIG. 11 depicts another embodiment of a fuel cell made in accordance with the present invention.

It will be appreciated that other embodiments of a fuel cell can be constructed in accordance with the teachings herein. In accordance with one embodiment as shown in FIG. 11, a fuel cell system 400 can be arranged into a horizontal orientation whereby a plurality of individual neighboring sub cells 410 are simultaneously irradiated by a single light source 420. Each sub cell 410 includes an anode, a cathode, an electrolyte (e.g., a PEM) and a supporting gas distribution system. Since such a fuel cell is expected to operate near room temperature, the byproduct of the fuel cell will likely be liquid water. As such, a pressurized drain tank 430 can be provided and/or a heater 440 can be provided to vaporize the water byproduct to form steam and facilitate passing it through an exhaust system.

The light source 420 can take on a variety of forms, including sunlight, arc and incandescent sources, and need not be a laser. In accordance with one embodiment, the light source 420 can include a plurality of fiber optic cables adapted and configured to illuminate the cathode. Such application of fiber optic light distribution can be utilized to retain a traditional stacked configuration of sub cells, instead of the horizontal orientation discussed above. Also, a thin-film-transistor (TFT) display can also be employed. It will be understood that other types of lighting devices can be used, depending on the adsorbate used. For example, if the energy difference between the electronic states of the metal of the electrode and of the adsorbate is fairly small, lower energy light sources could be used, such as those operating in the infrared range. As such, in certain metal-adsorbate combinations, even a suitably configured radiative heating element could provide sufficient energy to drive the photocatalysis.

Figure 12:
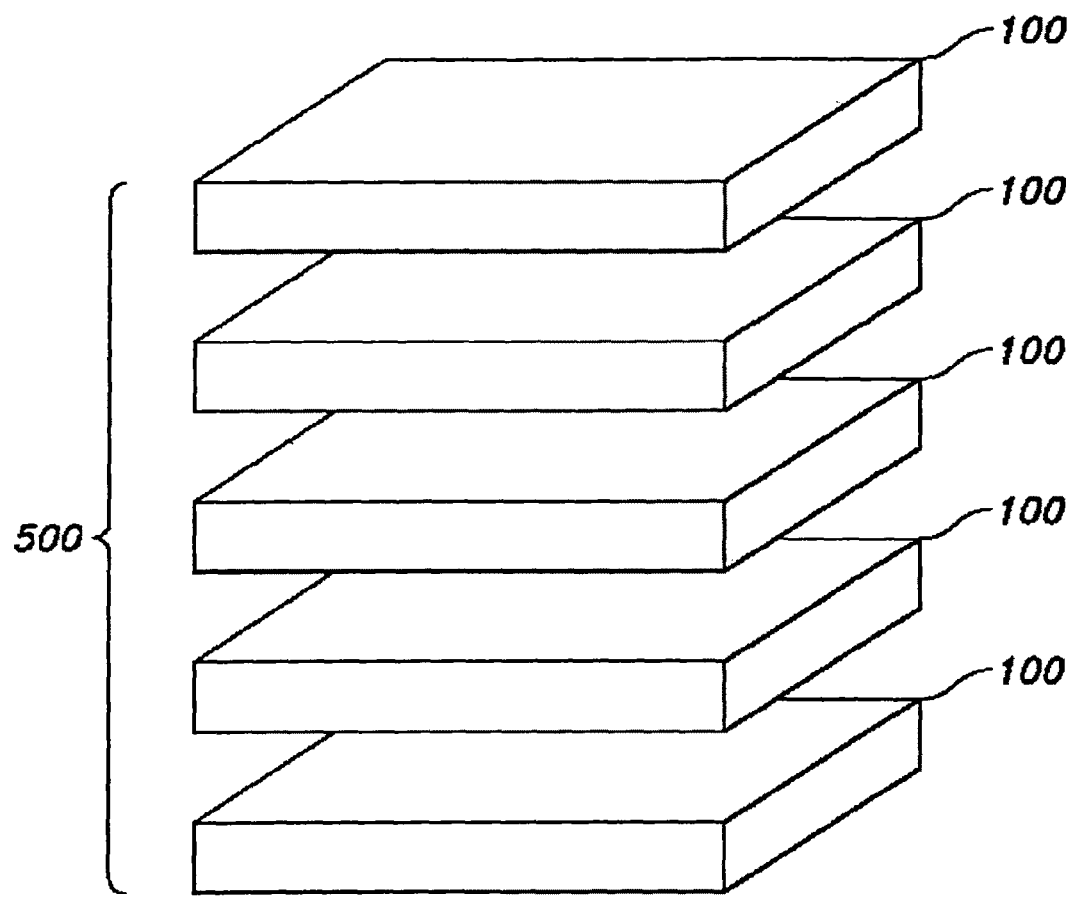
FIG. 12 depicts yet another embodiment of a fuel cell made in accordance with the present invention.

By way of further example, as shown in FIG. 12, a plurality of fuel cells 100 are arranged to form a stack 500. Each fuel cell 100 can include a cathode, an anode and an electrolyte. Alternatively, a plurality of horizontal units 400 can be arranged into a stack to obtain a higher output voltage.

The number of surface active sites that are photocatalytically active appears to be tied to the number of $Ag^+$ surface sites, referred to as silver adatoms or adclusters. The number of these active sites is dependent upon surface preparation and is probably limited to near 5-10% of the entire metal surface. This limitation is addressed because the overwhelming economic benefit of silver allows the entire cathode to be a porous silver membrane (available from Sterlitech™ Corporation), compared to the limited dispersions of platinum on graphite. The silver membrane provides an exceptionally large surface area, of which 5-10% will be photocatalytic following electrochemical roughening and addition of adsorbate. The utility of the silver membrane cathode extends beyond its economic advantage, simplifying the fuel cell design in spite of the requirement for light at the cathode.

There are many advantages that a photocatalytic fuel cell as described herein presents over a conventional fuel cell. As mentioned above, a platinum-catalyzed hydrogen fuel cell operates at moderate current levels at cell voltages close to +0.75 volts instead of the thermodynamic equilibrium cell voltage is +1.23 volts. This amounts to an overvoltage of −0.48 volts below the thermodynamic voltage, thus limiting the efficiency to near 60%. However, when electrodes as described herein are used in the place of a conventional cathode, there is virtually no tendency for the voltage of the metal to wander negatively, resulting in increased electrochemical efficiency of the cell, limited only by the oxidation potential of the metal used for the cathode. Platinum oxidizes at +1.18 Volts (vs. a normal hydrogen reference electrode: NHE). If gold is used as an electrode material, it is possible to operate the cell at the full voltage of 1.23 Volts, since gold oxidizes at about 1.498 volts vs. NHE. Silver oxidizes just negative of +0.80 Volts vs. NHE, near the same operating voltage of conventional Pt-containing fuel cells, but holds a significant economic advantage over platinum. Palladium oxidizes at +0.951 Volts vs. NHE and can be used as a catalyst when configured to have a surface capable of producing surface enhanced Raman scattering from adsorbate molecules.

It will be understood that while a PEM fuel cell has been illustrated above, electrodes made in accordance with the invention can be utilized with other types of fuel cells and hydrogen-containing fuels, including, for example, phosphoric acid fuel cells, solid oxide fuel cells, direct methanol fuel cells and the like. However, in higher temperature applications, it is believed that an organic adsorbate might decompose. However, inorganic adsorbates, such as iodine, may be more suitable for operation at elevated temperatures, though the utility of any adsorbate is limited by the temperature at which thermal desorption occurs.

The methods, devices and systems of the present invention, as described above and shown in the drawings, provide for an electrode and a fuel cell with superior properties as described above. It will be apparent to those skilled in the art that various modifications and variations can be made in the device and method of the present invention without departing from the spirit or scope of the invention. Thus, it is intended that the present invention include modifications and variations that are within the scope of the appended claims and their equivalents.

What is claimed is:

1. An electrode, comprising an electrically conductive material having a surface capable of producing surface enhanced Raman scattering of incident light from an adsorbate material including iodine adsorbed on the surface of the electrode, the adsorbate being substantially reducible and not substantially oxidizable.

2. The electrode of claim 1, wherein the surface is roughened to produce a plurality of adatoms or clusters of adatoms of a metallic material.

3. The electrode of claim 2, wherein the metallic material includes material selected from the group consisting of silver, osmium, palladium, iridium, platinum, gold, and alloys and mixtures thereof.

4. The electrode of claim 1, wherein the adsorbate material further includes a reducible organic or inorganic molecule that requires more than one electron to fully reduce.

5. The electrode of claim 4, wherein the adsorbate material further includes bis-1,2-(4-pyridyl)acetylene (BPA).

6. The electrode of claim 4, wherein the adsorbate material further includes a second halogen material.

7. A method of making an electrode, comprising:
a) providing an electrode made from an electrically conductive material, the electrode having a surface capable of producing surface enhanced Raman scattering of incident light when an adsorbate including iodine is applied thereto;
b) applying the adsorbate to the surface of the electrode, the adsorbate being substantially reducible and not substantially oxidizable.

8. The method of claim 7, further comprising roughening the surface of the electrode to produce a plurality of adatoms or clusters of adatoms of a metallic material.

9. The method of claim 8, wherein the metallic material includes material selected from the group consisting of silver, osmium, palladium, iridium, platinum, gold, and alloys and mixtures thereof.

10. The method of claim 8, wherein the surface is roughened by immersing the electrode in a halide solution and applying electrical current across the metallic material.

11. The method of claim 10, wherein the halide solution is a liquid chloride solution.

12. The method of claim 8, wherein the roughened surface is produced by a process selected from the group consisting of nanofabrication, chemical vapor deposition, sputtering and plasma enhanced chemical vapor deposition.

13. The method of claim 7, wherein the adsorbate material further includes a reducible organic or inorganic molecule that requires more than one electron to fully reduce.

14. The method of claim 13, wherein the adsorbate material further includes bis-1,2-(4-pyridyl)acetylene (BPA).

15. The method of claim 13, wherein the adsorbate material further includes a halide.

* * * * *